United States Patent
Bartley et al.

(10) Patent No.: US 10,765,575 B2
(45) Date of Patent: Sep. 8, 2020

(54) PATIENT SUPPORT SYSTEMS WITH ROTARY ACTUATORS COMPRISING ROTATION LIMITING DEVICES

(71) Applicant: Stryker Corporation, Kalamazoo, MI (US)

(72) Inventors: Gary L. Bartley, Kalamazoo, MI (US); Connor F. St. John, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 568 days.

(21) Appl. No.: 15/635,836

(22) Filed: Jun. 28, 2017

(65) Prior Publication Data

US 2018/0000670 A1 Jan. 4, 2018

Related U.S. Application Data

(60) Provisional application No. 62/356,359, filed on Jun. 29, 2016.

(51) Int. Cl.
*A61G 7/002* (2006.01)
*F16H 1/46* (2006.01)
(Continued)

(52) U.S. Cl.
CPC ............ *A61G 7/002* (2013.01); *A61G 7/015* (2013.01); *A61G 7/018* (2013.01); *F16D 41/066* (2013.01);
(Continued)

(58) Field of Classification Search
CPC .................................................... A61G 7/002
(Continued)

(56) References Cited

U.S. PATENT DOCUMENTS

| 1,629,277 A | 5/1927 | Koeb |
| 2,271,201 A | 1/1942 | Otto |

(Continued)

FOREIGN PATENT DOCUMENTS

| CN | 205859053 U | 1/2017 |
| FR | 2714135 A1 | 6/1995 |

(Continued)

OTHER PUBLICATIONS

YouTube, Renold Sprag Latch, published May 28, 2012; URL: https://www.youtube.com/watch?v=Fsp3fm4KHs0.
(Continued)

*Primary Examiner* — Fredrick C Conley
(74) *Attorney, Agent, or Firm* — Howard & Howard Attorneys PLLC

(57) ABSTRACT

A patient support system comprises a patient support apparatus for patients. The patient support apparatus comprises a base and a patient support surface supported by the base. The patient support apparatus also comprises movable members that are movable between at least a first position and a second position. One or more rotary actuators with rotation limiting devices are coupled to each movable member. The actuator with the rotation limiting device permits drive torque to move the movable member in a desired position between the first and second positions and restricts back drive torque from moving the movable member.

22 Claims, 27 Drawing Sheets

(51) Int. Cl.
*F16D 41/066* (2006.01)
*A61G 7/018* (2006.01)
*A61G 7/015* (2006.01)
*F16H 35/00* (2006.01)
*F16H 57/10* (2006.01)

(52) U.S. Cl.
CPC .............. *F16H 1/46* (2013.01); *F16H 35/00* (2013.01); *F16H 57/10* (2013.01); *F16H 2035/005* (2013.01)

(58) Field of Classification Search
USPC .................................................. 5/613–618
See application file for complete search history.

(56) References Cited

U.S. PATENT DOCUMENTS

| | | | |
|---|---|---|---|
| 2,481,477 A * | 9/1949 | Peery | A47C 20/041 74/89.26 |
| 2,504,737 A | 4/1950 | Sharpes | |
| 2,605,481 A | 8/1952 | Burkhart | |
| 2,913,300 A | 11/1959 | Darnell et al. | |
| 2,947,364 A | 8/1960 | Haworth | |
| 3,129,607 A | 4/1964 | Schaefer | |
| 3,198,891 A | 8/1965 | Burst et al. | |
| 3,278,952 A | 10/1966 | Holm | |
| 3,307,663 A | 3/1967 | Luenberger | |
| 3,532,882 A | 10/1970 | Craig | |
| 3,558,944 A | 1/1971 | Verge | |
| 3,583,248 A | 6/1971 | Langenberg | |
| 3,627,377 A | 12/1971 | Pickles | |
| 3,921,264 A | 11/1975 | Madonian et al. | |
| 3,972,081 A | 8/1976 | Stern et al. | |
| 4,047,842 A | 9/1977 | Avena et al. | |
| 4,062,075 A | 12/1977 | Stern et al. | |
| 4,271,726 A | 6/1981 | Ryffel | |
| 4,398,313 A | 8/1983 | Mitchell | |
| 4,425,673 A | 1/1984 | Werner | |
| 4,472,845 A | 9/1984 | Chivetta et al. | |
| 4,472,846 A | 9/1984 | Volk, Jr. et al. | |
| 4,480,733 A | 11/1984 | Grimm et al. | |
| 4,499,618 A | 2/1985 | Werner | |
| 4,747,212 A | 5/1988 | Cavdek | |
| 4,890,979 A | 1/1990 | Ames et al. | |
| 4,914,330 A | 4/1990 | Pierrat | |
| 5,102,377 A | 4/1992 | Spanski | |
| 5,269,031 A | 12/1993 | Alexander | |
| 5,355,743 A | 10/1994 | Tesar | |
| 5,482,305 A | 1/1996 | Jeffries et al. | |
| 5,518,466 A | 5/1996 | Tiedeman | |
| 6,024,664 A | 2/2000 | Shaffner | |
| 6,231,012 B1 * | 5/2001 | Cacciola | F64C 13/34 464/30 |
| 6,510,852 B1 | 1/2003 | Shiery et al. | |
| 6,631,797 B2 | 10/2003 | Capewell | |
| 6,739,004 B1 | 5/2004 | Abrahamsen et al. | |
| 6,805,371 B2 | 10/2004 | Meginniss, III et al. | |
| 7,802,331 B2 | 9/2010 | Brown et al. | |
| 8,056,981 B2 | 11/2011 | Kojima et al. | |
| 8,308,599 B2 | 11/2012 | Akami | |
| 8,312,579 B2 | 11/2012 | Bock | |
| 8,981,271 B1 | 3/2015 | Risner et al. | |
| 10,011,190 B2 | 7/2018 | Markel et al. | |
| 10,124,874 B1 | 11/2018 | Jaeger et al. | |
| 2002/0089223 A1 | 7/2002 | Yu | |
| 2005/0160856 A1 | 7/2005 | Sugitani | |
| 2006/0247089 A1 | 11/2006 | Guo et al. | |
| 2007/0174965 A1 * | 8/2007 | Lemier | A61G 7/002 74/89.26 |
| 2008/0045374 A1 | 2/2008 | Weinberg et al. | |
| 2009/0062053 A1 | 3/2009 | Kobayashi | |
| 2009/0166995 A1 | 7/2009 | Sorquist | |
| 2010/0004087 A1 | 1/2010 | Minegishi et al. | |
| 2011/0092332 A1 | 4/2011 | Evenson | |
| 2011/0113556 A1 | 5/2011 | Roussy et al. | |
| 2011/0241306 A1 | 10/2011 | Serkh et al. | |
| 2011/0319217 A1 | 12/2011 | Imase et al. | |
| 2012/0060276 A1 | 3/2012 | Heidlage et al. | |
| 2014/0053333 A1 | 2/2014 | Krieg et al. | |
| 2014/0155215 A1 | 6/2014 | Rademakers | |
| 2014/0283648 A1 | 9/2014 | Severinsson | |
| 2014/0371028 A1 | 12/2014 | Billmeyer | |
| 2015/0283924 A1 | 10/2015 | Boutouil et al. | |
| 2016/0053858 A1 | 2/2016 | Brassitos et al. | |
| 2016/0070247 A1 | 3/2016 | Ohishi et al. | |
| 2016/0076624 A1 | 3/2016 | Uchihara et al. | |
| 2016/0106615 A1 | 4/2016 | Lee et al. | |
| 2016/0156248 A1 | 6/2016 | Lueker | |
| 2016/0169327 A1 | 6/2016 | Fujita et al. | |
| 2016/0290440 A1 | 10/2016 | Chhour | |
| 2016/0302985 A1 | 10/2016 | Tessmer et al. | |
| 2016/0348759 A1 | 12/2016 | McCloy | |
| 2017/0059002 A1 | 3/2017 | Sasaki | |
| 2017/0335944 A1 | 11/2017 | Nishimura | |
| 2018/0000670 A1 | 1/2018 | Bartley et al. | |
| 2018/0000673 A1 | 1/2018 | Bartley | |
| 2018/0000674 A1 | 1/2018 | Bartley | |
| 2018/0000675 A1 | 1/2018 | Heneveld, Jr. et al. | |
| 2018/0000672 A1 | 4/2018 | Heneveld, Jr. et al. | |
| 2020/0008991 A1 | 1/2020 | Wu | |

FOREIGN PATENT DOCUMENTS

| | | |
|---|---|---|
| JP | 2003180762 A | 7/2003 |
| JP | 2017041210 A | 2/2017 |
| JP | 2017137888 A | 8/2017 |
| WO | 0117399 A1 | 3/2001 |
| WO | 0117400 A1 | 3/2001 |
| WO | 2009019846 A1 | 2/2009 |

OTHER PUBLICATIONS

GMN Bearing USA, Functionality of the Sprag Clutch Design, available as least as early as Jun. 23, 2016; URL: https://www.gmnbt.com/sprag-clutch-design.htm.

Youtube, Renold Trapped Roller Clutch, published May 28, 2012; URL: https://www.youtube.com/watch?v=QjR7dimpSJA.

Moog, Aircraft Mechanical Actuators, available at least as early as Feb. 3, 2016; URL: http://www.moog.com/products/actuators-servoactuators/actuation-technologies/mechanical/aircraft-mechanical-actuators/.

YouTube, Hypocycloid Reducer, 100:1, Internal View, published Apr. 23, 2009; URL: https://www.youtube.com/watch?v=SH46bpe1cNA.

English language abstract and machine-assisted translation for JP2003180762 extracted from espacenet.com on Feb. 20, 2018; 9 pages.

English language abstract and machine-assisted English translation for CN205859053 extracted from espacenet.com database on Jul. 26, 2018, 12 pages.

English language abstract and machine-assisted English translation for FR 2 714 135 extracted from espacenet.com database on Jul. 26, 2018, 7 pages.

English language abstract and machine-assisted English translation for JP 2017-041210 extracted from PAJ database on Jul. 26, 2018, 54 pages.

English language abstract and machine-assisted English translation for JP 2017-137888 extracted from espacenet.com database on Jul. 26, 2018, 26 pages.

Crouzet Motors, "Crouzet Webpage", downloaded from http://motors.crouzet.com on Jul. 25, 2018, 3 pages.

Crouzet Motors, "80 W Motomate Planetary Gearboxes Part Number Made to Order Brochure", www.crouzet.com, Feb. 11, 2015, 4 pages.

Crouzet Motors, "Motors and Gearmotors Panorama Brochure", Jul. 2016, 5 pages.

Lin, Wang-Sung et al., "Design of a Two-Stage Cycloidal Gear Reducer with Tooth Modifications", Mechanism and Machine Theory, vol. 79, 2014, pp. 184-197.

(56) References Cited

OTHER PUBLICATIONS

Motion Solutions—RM Hoffman Division, "Nabtesco Motion Conrol Solutions—Cycloidal Gear Reducers Webpage", http://www.rmhoffman.com/nabtesco-motion-control.html, 2018, 4 pages.
Nabtesco, "High Performance Reduction Gears & Servo Actuators Brochure", 2018, 12 Pages.
Onvio LLC, "Zero Backlash Speed Reducers Brochure", 2005, pp. 1-19.
English language abstract and machine-assisted English translation of Equivalent JP 2009-036365 for WO 2009/019846 extracted from espacenet.com database on May 7, 2020, 13 pages.

\* cited by examiner

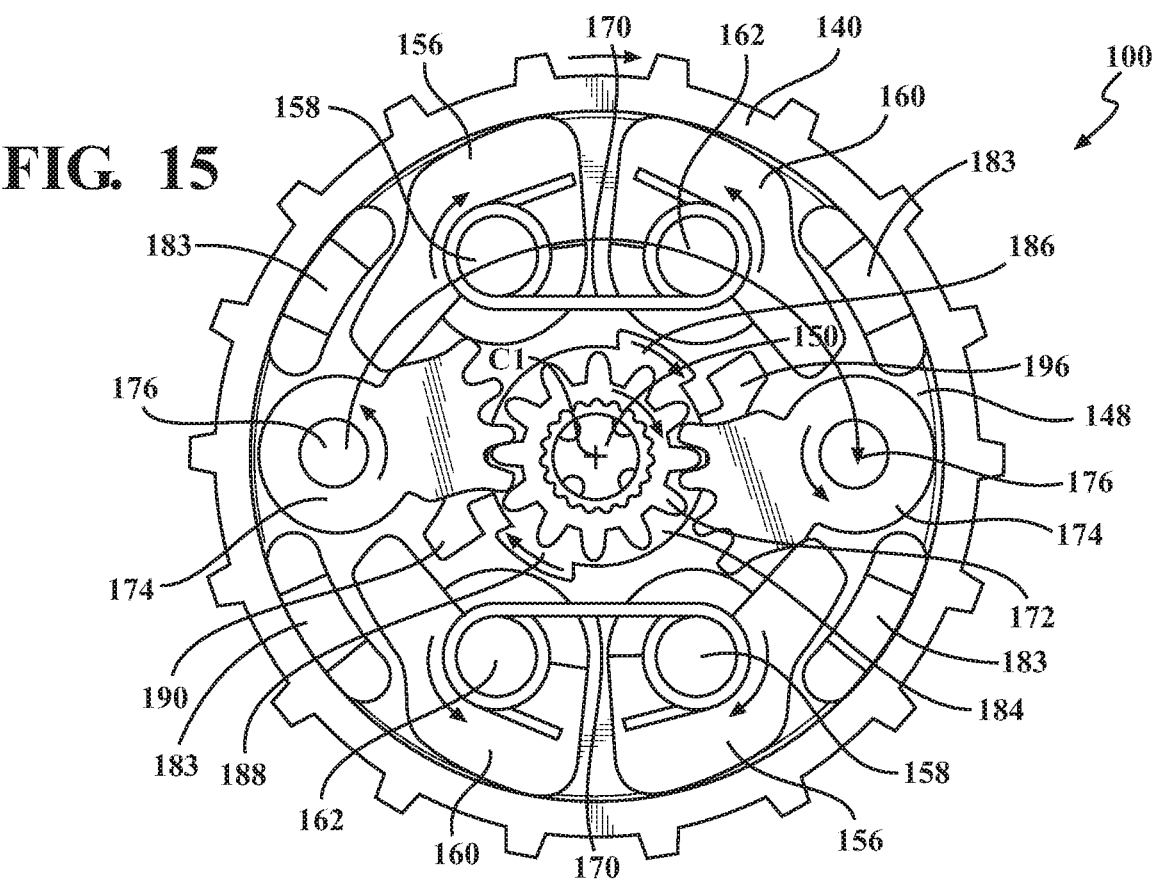

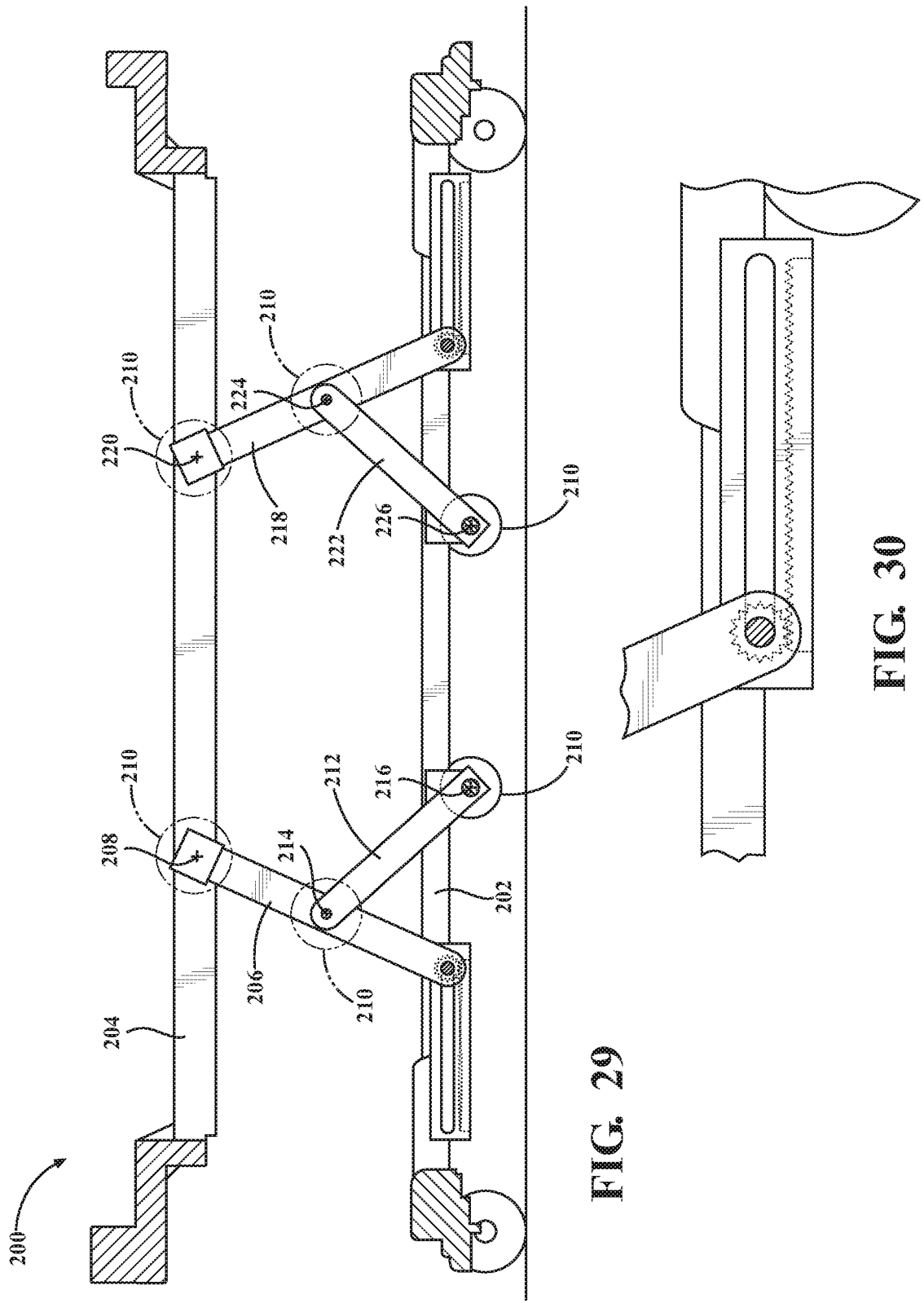

PATIENT SUPPORT SYSTEMS WITH ROTARY ACTUATORS COMPRISING ROTATION LIMITING DEVICES

RELATED APPLICATIONS

This application claims the benefit of and priority to U.S. Provisional Patent Application No. 62/356,359, filed on Jun. 29, 2016, the entire contents and disclosure of which are hereby incorporated by reference herein in their entirety.

BACKGROUND

Patient support systems facilitate care of patients in a health care setting. Patient support systems comprise patient support apparatuses such as, for example, hospital beds, stretchers, cots, and wheelchairs. Conventional patient support apparatuses comprise a base and a patient support surface upon which the patient is supported. Often, these patient support apparatuses also have movable members such as lift members, patient support deck sections, a bed length extension member, a bed width extension member, a wheel, a side rail, a footboard, or a headboard. One or more of these movable members may be moved using actuators. Typically, in order to move these movable members, linear actuators are used. Linear actuators take up a large and undesirable amount of space within or beneath the patient support apparatus. Rotary actuators may also be used to move the movable members. Rotary actuators often encounter difficulty preventing movable members from back driving and going into undesirable positions in certain situations, such as during a loss of power or when components break. Additionally, rotary actuators generally lack stiffness to give a caregiver or patient confidence in the structural integrity of the rotary actuator. A patient support apparatus designed to overcome one or more of the aforementioned challenges is desired.

BRIEF DESCRIPTION OF THE DRAWINGS

FIG. 15 is an elevational view of the no-back device in a drive torque aiding scenario.

FIG. 29 is an elevational view illustrating one embodiment of where one of the actuators may be coupled.

FIG. 30 is an elevational view illustrating another embodiment of where one of the actuators may be coupled.

DETAILED DESCRIPTION

Figure 1:
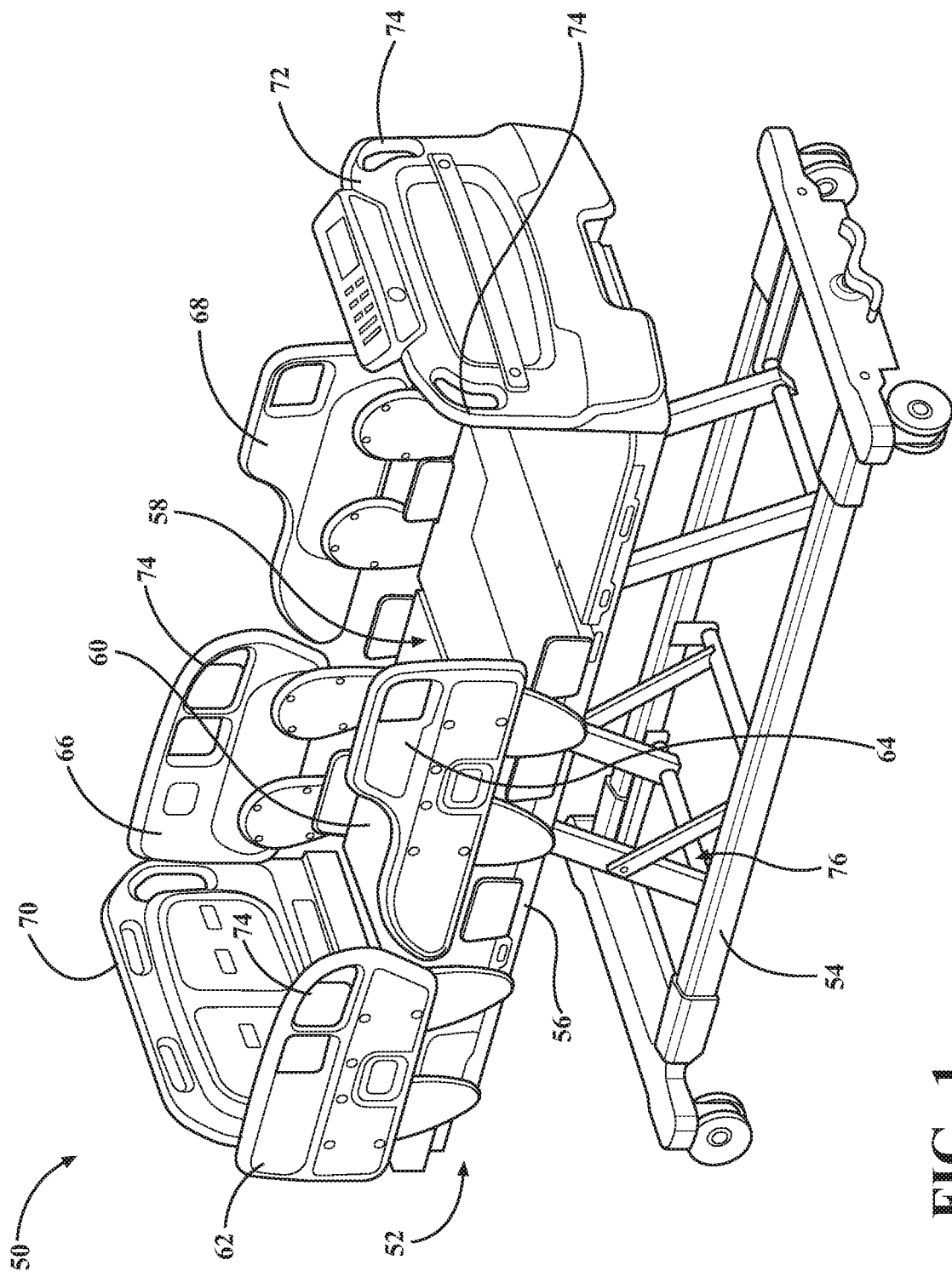
FIG. 1 is a perspective view of a patient support apparatus.

Referring to FIG. 1, a patient support system comprising a patient support apparatus 50 is shown for supporting a patient in a health care setting. The patient support apparatus 50 illustrated in FIG. 1 comprises a hospital bed. In other embodiments, however, the patient support apparatus 50 may comprise a stretcher, cot, table, wheelchair, or similar apparatus utilized in the care of a patient.

A support structure 52 provides support for the patient. The support structure 52 illustrated in FIG. 1 comprises a base 54 and an intermediate frame 56. The intermediate frame 56 is spaced above the base 54. The support structure 52 also comprises a patient support deck 58 disposed on the intermediate frame 56. The patient support deck 58 comprises several sections, some of which are pivotable relative to the intermediate frame 56, such as a fowler section, a seat section, a thigh section, and a foot section. The patient support deck 58 provides a patient support surface 60 upon which the patient is supported.

A mattress (not shown) is disposed on the patient support deck 58. The mattress comprises a secondary patient support surface upon which the patient is supported. The base 54, intermediate frame 56, patient support deck 58, and patient support surfaces 60 each have a head end and a foot end corresponding to designated placement of the patient's head and feet on the patient support apparatus 50. The construction of the support structure 52 may take on any known or conventional design, and is not limited to that specifically set forth above. In addition, the mattress may be omitted in certain embodiments, such that the patient rests directly on the patient support surface 60.

Side rails 62, 64, 66, 68 are coupled to the intermediate frame 56 and thereby supported by the base 54. A first side rail 62 is positioned at a right head end of the intermediate frame 56. A second side rail 64 is positioned at a right foot end of the intermediate frame 56. A third side rail 66 is positioned at a left head end of the intermediate frame 56. A fourth side rail 68 is positioned at a left foot end of the intermediate frame 56. If the patient support apparatus 50 is a stretcher or a cot, there may be fewer side rails. The side rails 62, 64, 66, 68 are movable between a raised position in which they block ingress and egress into and out of the patient support apparatus 50 and a lowered position in which they are not an obstacle to such ingress and egress and/or one or more intermediate positions therebetween. In still other configurations, the patient support apparatus 50 may not include any side rails.

A headboard 70 and a footboard 72 are coupled to the intermediate frame 56. In other embodiments, when the headboard 70 and footboard 72 are included, the headboard 70 and footboard 72 may be coupled to other locations on the patient support apparatus 50, such as the base 54. In still other embodiments, the patient support apparatus 50 does not include the headboard 70 and/or the footboard 72.

Caregiver interfaces 74, such as handles, are shown integrated into the footboard 72 and side rails 62, 64, 66, 68 to facilitate movement of the patient support apparatus 50 over floor surfaces. Additional caregiver interfaces 74 may be integrated into the headboard 70 and/or other components of the patient support apparatus 50. The caregiver interfaces 74 are graspable by the caregiver to manipulate the patient support apparatus 50 for movement. In other embodiments, the patient support apparatus 50 does not include caregiver interfaces 74.

Figure 2:
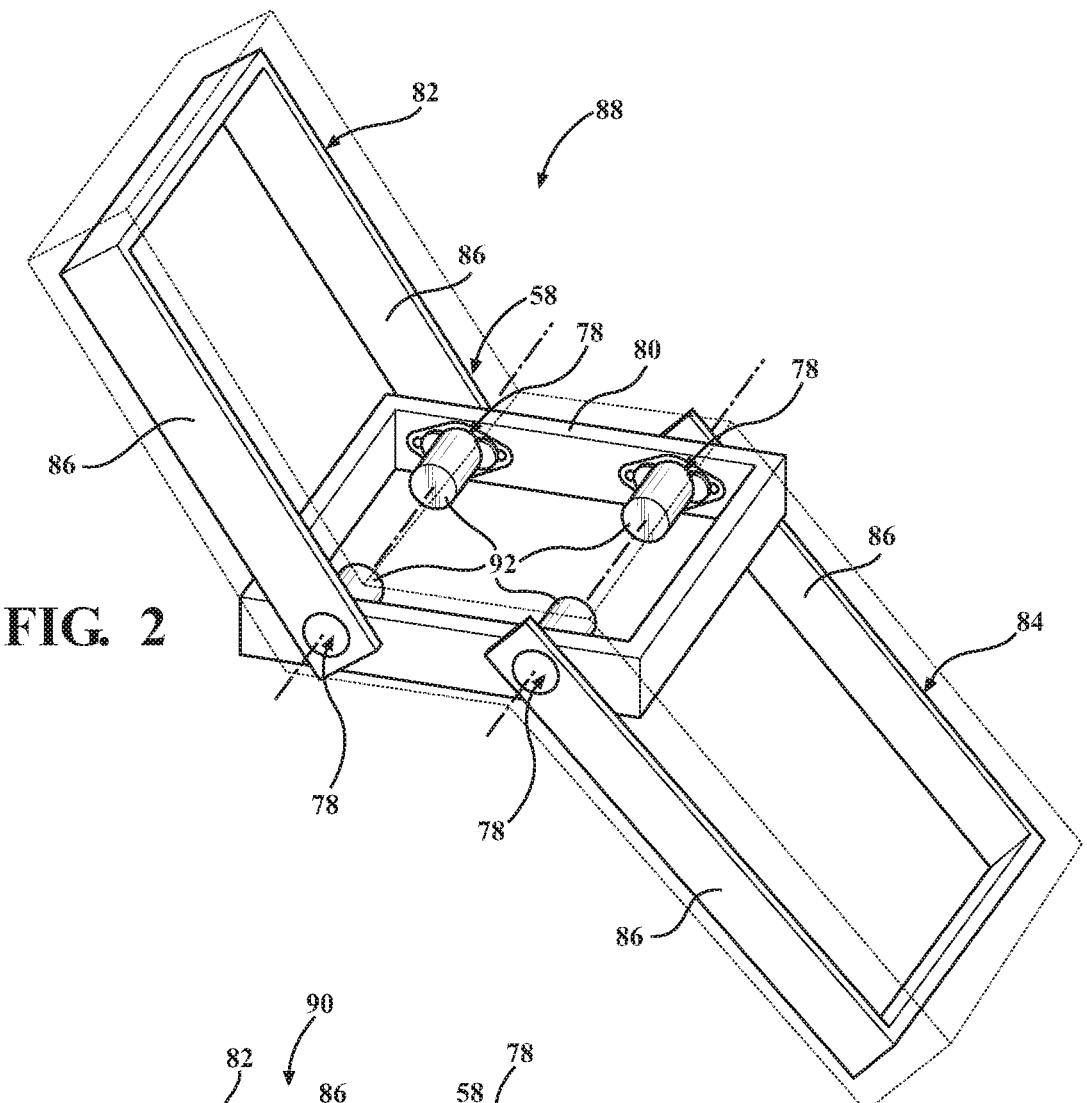
FIG. 2 is a perspective view of a patient support deck in a first position.

The patient support apparatus 50 may have numerous devices that comprise one or more movable members to perform a desired function. One such device is a lift device 76 that is coupled to the base 54 and the intermediate frame 56 to lift and lower the patient between minimum and maximum heights of the patient support apparatus 50, and/or intermediate positions therebetween. In the embodiment shown, the lift device 76 comprises a movable member in the form of a lift member for effectuating height changes of the patient support apparatus 50. Additionally, the patient support apparatus 50 may have other devices that comprise one or more movable members to perform a desired function such as a deck adjustment device configured to raise and/or lower one or more of the patient support deck sections. The movable members in these devices may be movable relative to another fixed or stationary member of the patient support apparatus 50 or movable relative to another member that also is movable. In some cases, the base 54 and/or the intermediate frame 56 may comprise the movable members. In these devices, one or more actuators 78 (see FIG. 2) are supported by the support structure 52. The actuators 78 are coupled to one or more of the movable members supported by the support structure 52. The movable member is any member supported by the support structure 52 and movable relative to any other member on the patient support apparatus 50, wherein the other member can include stationary or fixed members, or movable members.

Figure 3:
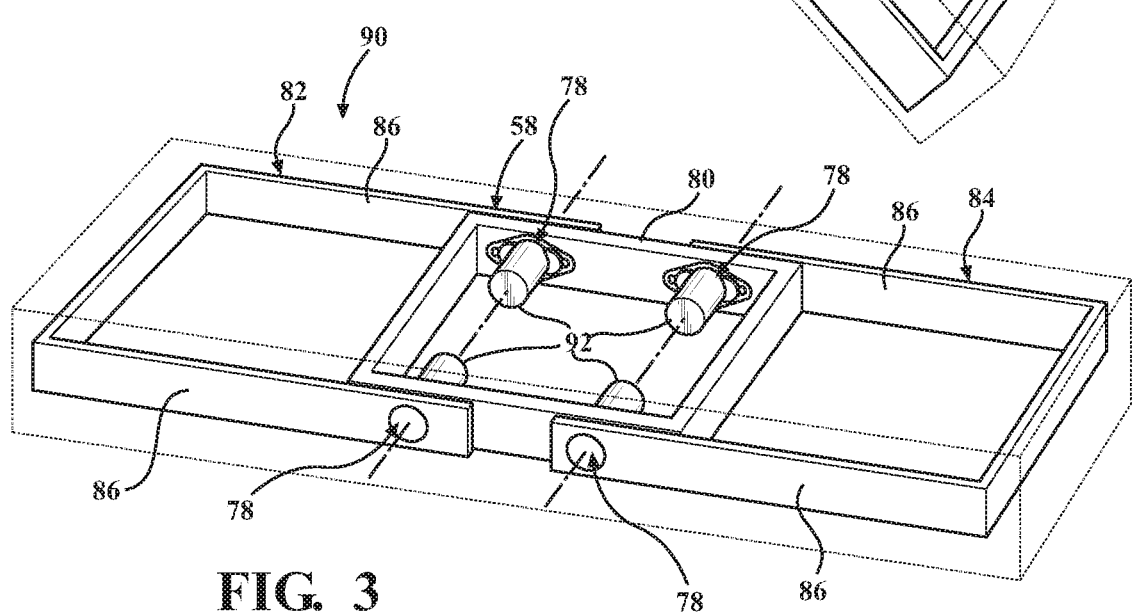
FIG. 3 is a perspective view of the patient support deck in a second position.

Although many different placements and uses of the actuators 78 are possible on a single patient support apparatus 50, only certain illustrative embodiments will be described in detail. In one embodiment shown in FIGS. 2-4, the patient support deck 58 comprises a seat section 80 supported by the base 54. The patient support deck 58 further comprises a fowler section 82 movably coupled to the seat section 80 and a foot section 84 movably coupled to the seat section 80 independent of the fowler section 82. In some embodiments, the seat section 80 is fixed to the intermediate frame 56. Actuators 78 are disposed between each of the fowler 82, foot 84, and seat 80 sections and are configured to move the fowler 82 and foot 84 sections relative to the seat section 80. In this embodiment, the fowler 82 and foot 84 sections comprise movable members 86 movable between at least a first position 88 shown in FIG. 2, a second position 90 shown in FIG. 3, and other positions therebetween. The fowler 82 and foot 84 sections may move concurrently or independently of each other. Four actuators 78 are shown, one for each movable member 86, but one actuator 78 could be employed to move a pair of the movable members 86, such that only one actuator 78 is employed to move each of the fowler section 82 and the foot section 84.

Figure 4:
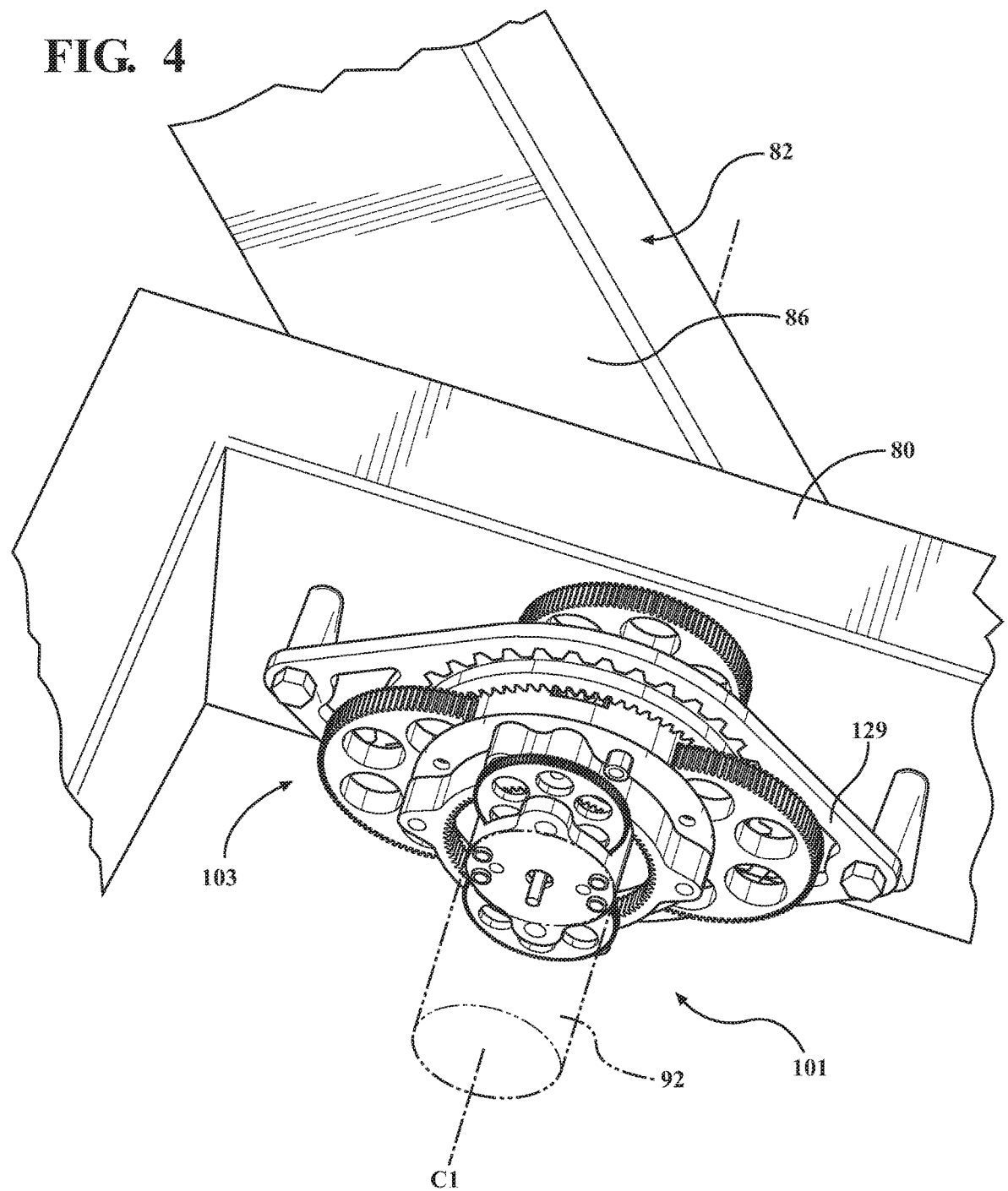
FIG. 4 is a perspective view of a rotary actuator coupled to a seat section and a fowler section of the patient support deck.

As shown in FIG. 4, one embodiment of one of the actuators 78, referenced as actuator 101, is shown between the fowler section 82 and the seat section 80. In many of the embodiments disclosed below, the movable member 86 of the fowler section 82 is described for convenience. The movable member 86 is coupled to the actuator 101. The actuator 101 comprises a motor 92. The motor 92 provides power for the actuator 101. The motor 92 may be an electric motor, a hydraulic motor, or any other motor adapted to provide power for the actuator 101. The actuator 101 shown in FIG. 4 is arranged to pivot the fowler section 82 relative to the seat section 80 about center axis C1. FIG. 4 shows the seat and fowler sections 80, 82. In the embodiment shown, the fowler section 82 articulates relative to the seat section 80 to move the fowler section 82 relative to the seat section 80. The actuator 101 further comprises a support frame 129 fixed to the seat section 80.

Figure 5:
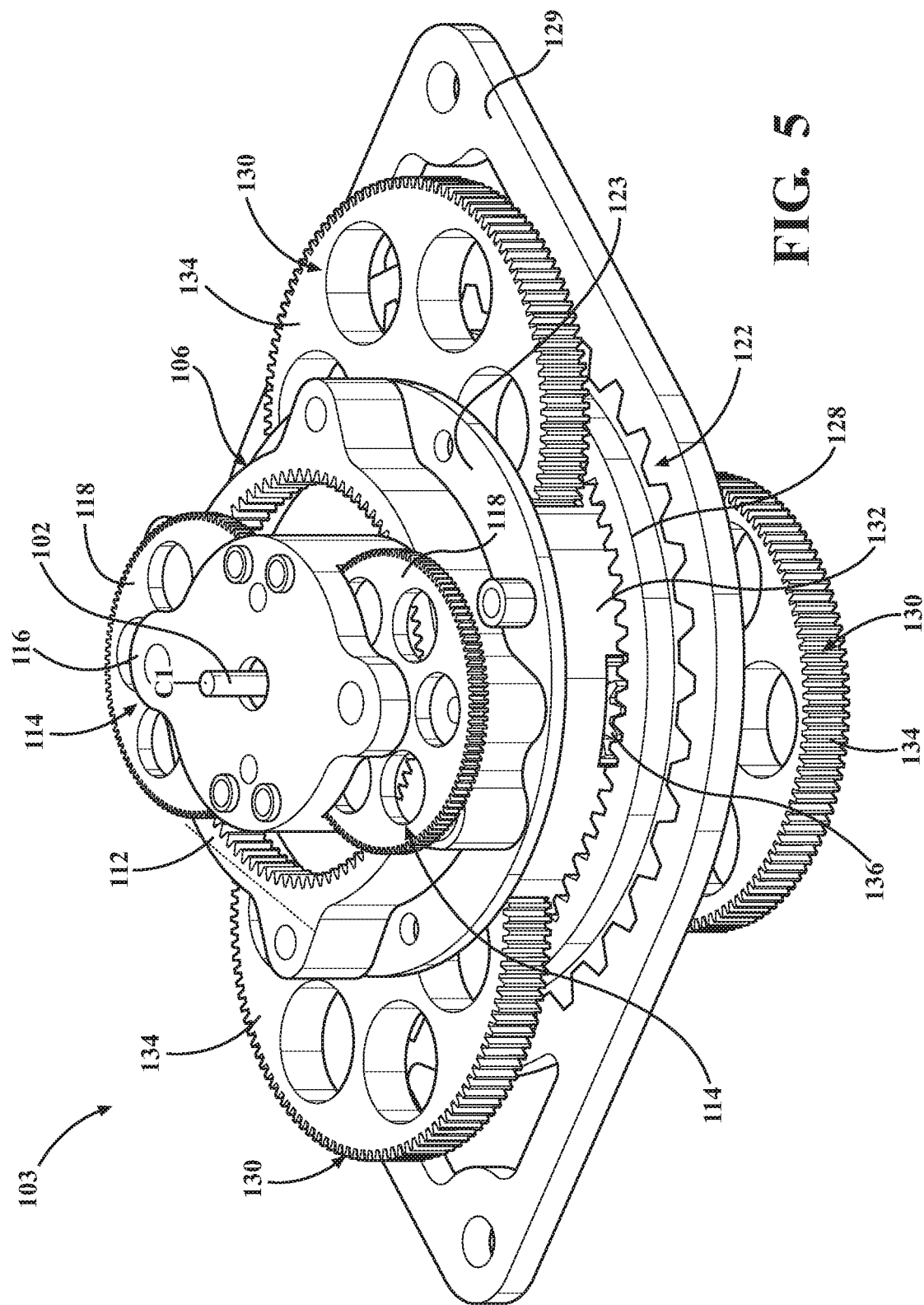
FIG. 5 is a perspective view of the rotary actuator having a no-back device.
Figure 6:
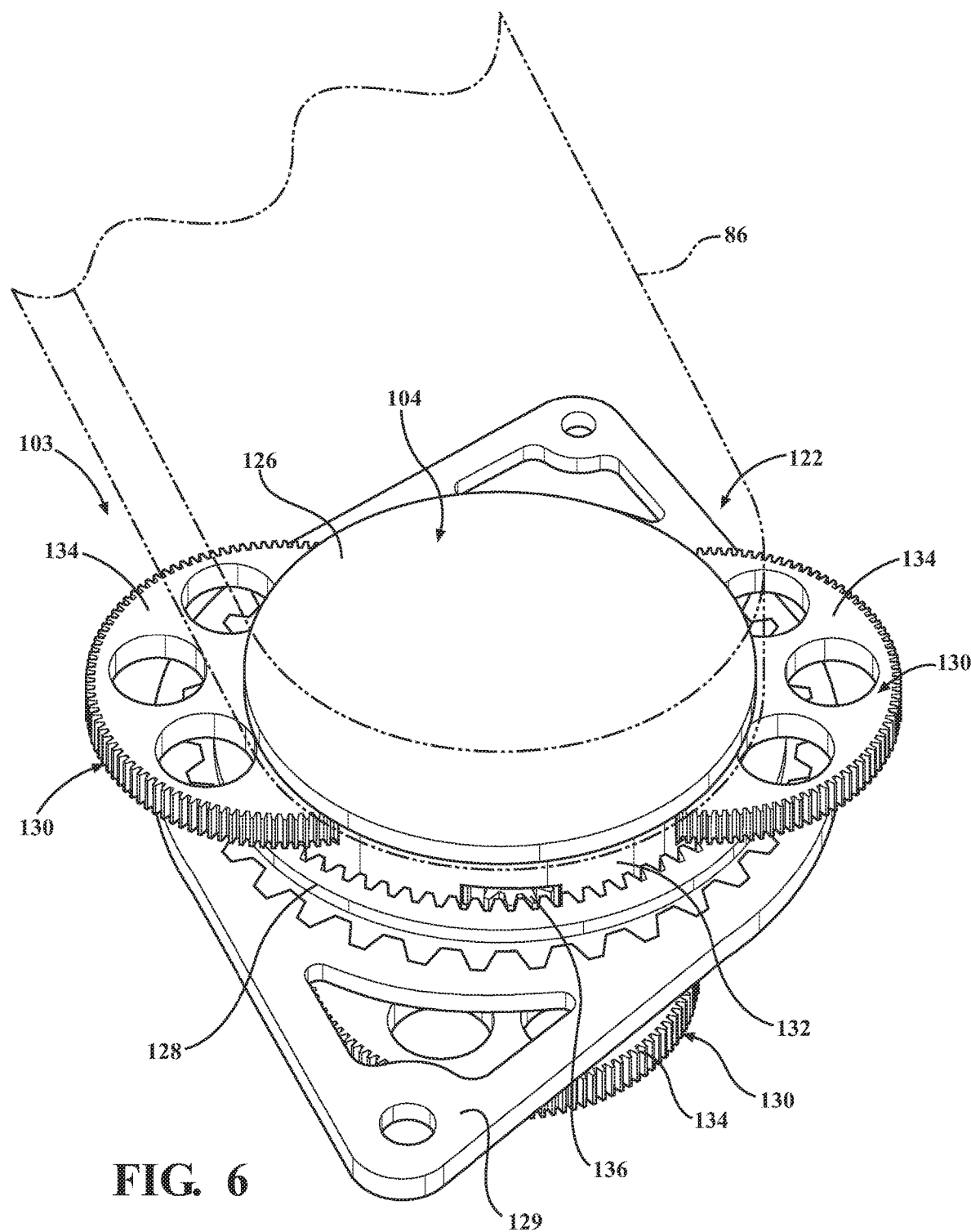
FIG. 6 is another perspective view of the rotary actuator having a no-back device.

As shown in FIGS. 5 and 6, opposing sides of the actuator 101 (without motor 92) are shown. The actuator 101 comprises a gear assembly 103 having an input element 102 (FIG. 5) and an output element 104 (FIG. 6) connected to the movable member 86. The actuator 101 further comprises a gear arrangement operable between the input element 102 and the output element 104. Power from the motor 92 translates to torque that is transmitted to the input element 102, through the gear arrangement, and results in rotation of the output element 104. The motor 92 can be mounted to the movable member 86 or other component of the patient support apparatus 50. In some cases like that shown in FIG. 4, the motor 92 is mounted to a component of the gear assembly 103 or a housing of the actuator 101. The motor 92 may also be fixed relative to the seat section 80. The gear assembly 103 is coupled to the support frame 129.

In one embodiment, the gear assembly 103 comprises a first planetary gear train 106 and a second planetary gear train 122 operably connected in sequence to the first planetary gear train 106. The gear assembly 103 further comprises a separating plate 123 disposed between and coupled to the first 106 and second 122 planetary gear trains. The separating plate 123 provides increased coupling options between the first planetary gear train 106 and the second planetary gear train 122.

It should be noted that in many of the figures described herein certain components of the actuator 101 and the gear assembly 103 have been removed for convenience of description and ease of illustration. Additionally, bearings, bushings or other members used to rotatably support parts of the gear assembly 103 are shown in the figures, but not described in detail as their utilization and function are well understood by those skilled in the art.

Figure 7:
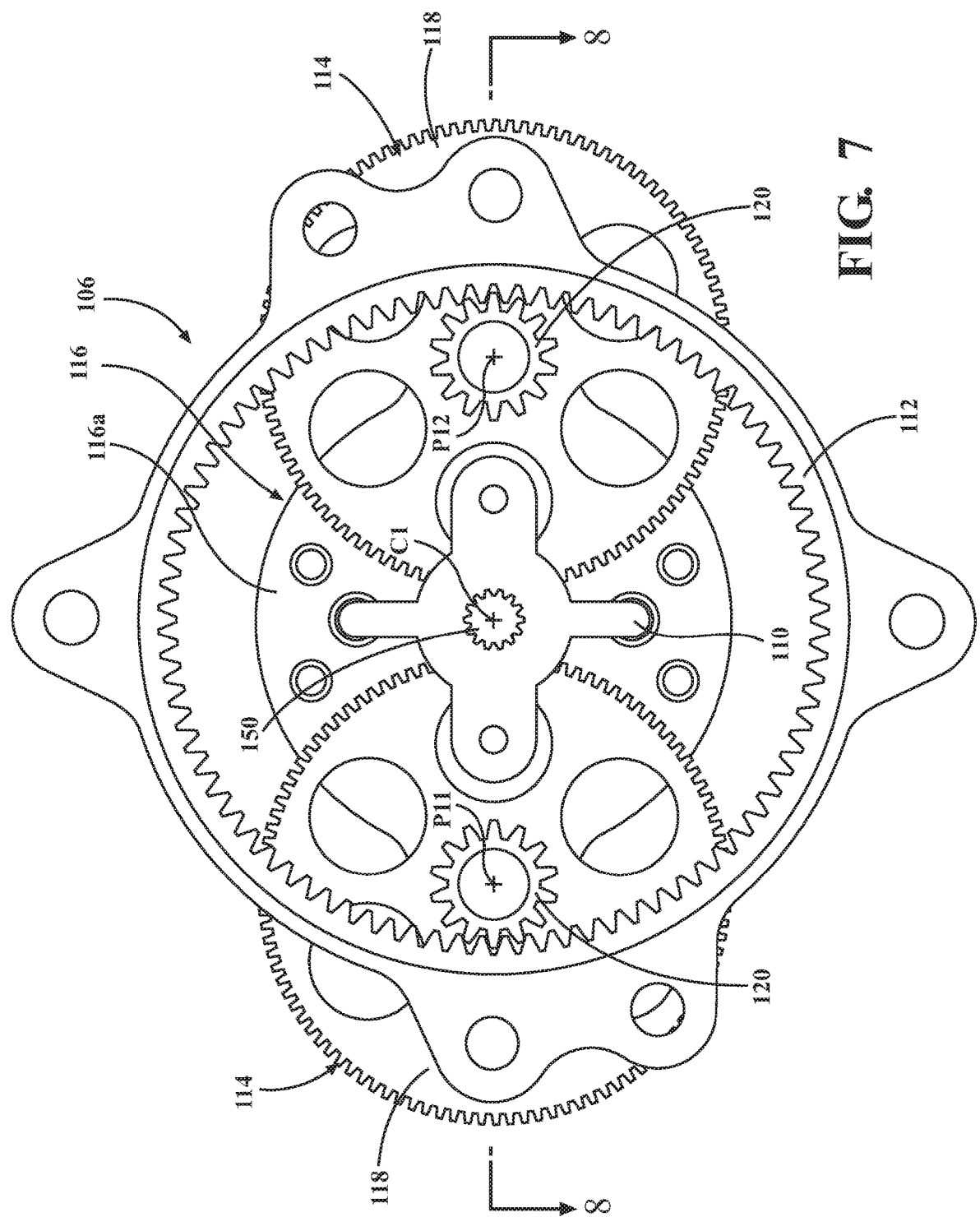
FIG. 7 is an elevational view of a first planetary gear train.
Figure 8:
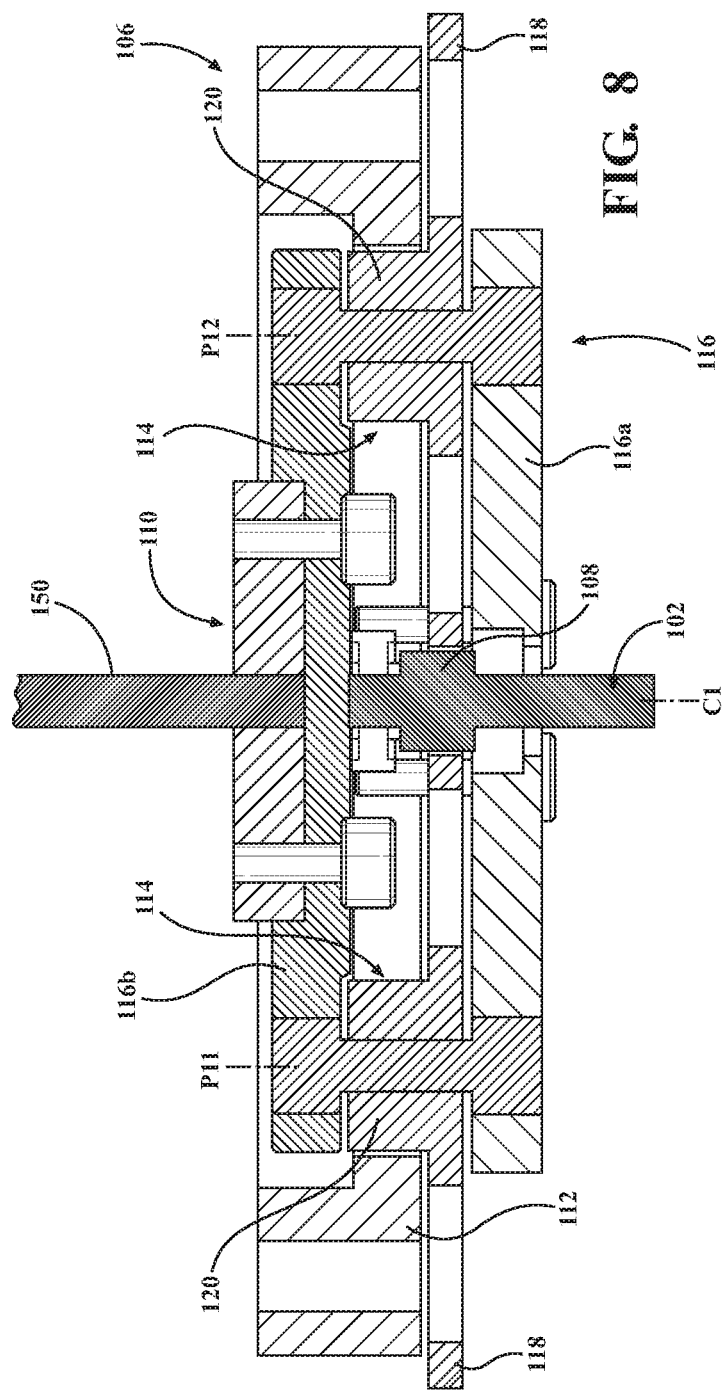
FIG. 8 is an elevational view illustrating a cross-section of FIG. 7.

As shown in FIGS. 7 and 8, the first planetary gear train 106 comprises an input gear 108 rotatable about the center axis C1 (the second planetary gear train 122 is not shown). In this embodiment, the input element 102 is fixed to the input gear 108 and the input gear 108 is configured to receive drive torque from the motor 92 through the input element 102. The first planetary gear train 106 further comprises an output member 110 and a gear arrangement operable between the input gear 108 and the output member 110. The gear arrangement is configured to transmit drive torque available at the input gear 108 to the output member 110.

In one embodiment shown in FIGS. 7 and 8, the input gear 108 is a sun gear rotatable about the center axis C1. The gear arrangement comprises a ring gear 112 disposed about the center axis C1 and an array of planet gear clusters 114. The ring gear 112, hereinafter referred to as the moving ring gear 112 rotates relative to the support frame 129 (see FIG. 5). The gear arrangement further comprises a carrier 116 rotatable about the center axis C1 relative to the input gear 108. The carrier 116 retains the array of planet gear clusters 114 in direct meshing relationship with the input gear 108 and the moving ring gear 112. The carrier 116 revolves the array of planet gear clusters 114 about the center axis C1. The output member 110 is fixed to the carrier 116 to rotate with the carrier 116.

The carrier 116 comprises a carrier plate 116a and a carrier housing 116b coupled to the carrier plate 116a. The array of planet gear clusters 114 are supported between the carrier plate 116a and the carrier housing 116b. The carrier housing 116b is removed in FIG. 7 to illustrate the meshing relationship between the array of planet gear clusters 114 and the moving ring gear 112.

The array of planet gear clusters 114 comprises first planet gears 118 spaced from each other and rotatable about respective planet gear axes P11, P12. Each of the first planet gears 118 is disposed in direct meshing relationship with the input gear 108.

The array of planet gear clusters 114 further comprises second planet gears 120 fixed to the first planet gears 118 to rotate with the first planet gears 118 about the planet gear axes P11, P12. Each of the second planet gears 120 is disposed in direct meshing relationship with the moving ring gear 112. Further, by virtue of being rotatably supported in the carrier 116, the carrier 116 rotates about the center axis C1 while the planet gears 118, 120 revolve about the center axis C1 during actuation. As mentioned above, the output member 110 is coupled to the carrier 116. Thus, the output member 110 rotates together with the carrier 116 about the center axis C1 while the planet gears 118, 120 revolve about the center axis C1. The planet gears 118, 120 may be integrally formed as shown in the figures. In alternative embodiments, the planet gears 118, 120 may be separate components fixed together.

The first planet gears 118 have physical configurations different from the second planet gears 120. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, and any combination thereof.

The first planet gears 118 have larger diameters and more teeth than the second planet gears 120. As a result of the first planet gears 118 having a greater number of teeth, a gear ratio between the input gear 108 and the output member 110 is increased. Said differently, as the number of teeth on the first planet gears 118 increase, the input gear 108 requires a greater number of rotations to result in a single rotation of the output member 110.

In an alternative embodiment, the first planet gears 118 may be identical to the second planet gears 120. In still other embodiments, the array of planet gear clusters 114 may be an array of planet gears comprising only first planet gears 118 in direct meshing relationship with both the input gear 108 and the moving ring gear 112.

The array of planet gear clusters 114 comprises two first planet gears 118 and two second planet gears 120. In some embodiments, the array of planet gear clusters 114 comprises more than two first planet gears 118 and more than two second planet gears 120.

Figure 9:
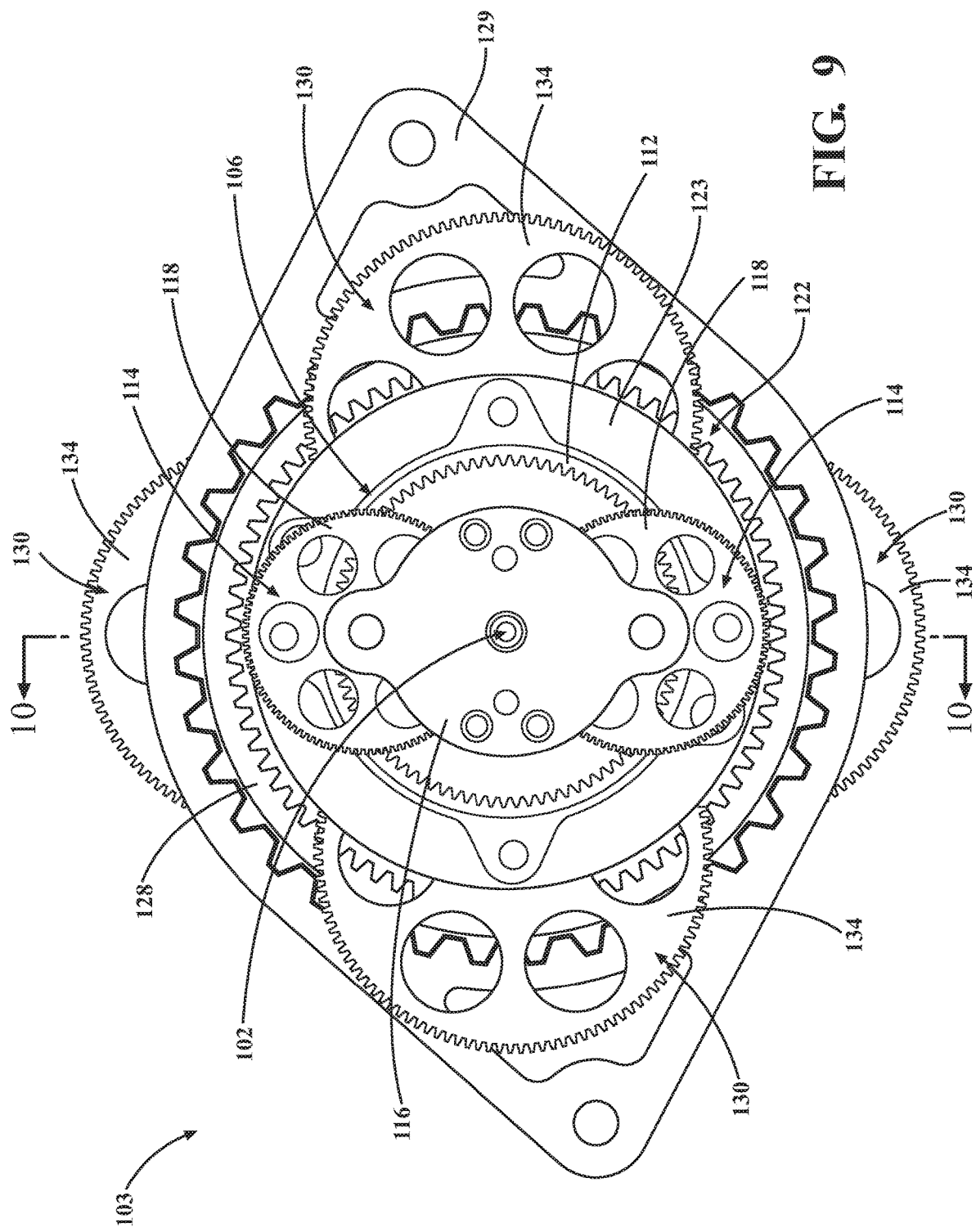
FIG. 9 is an elevational view of a gear assembly having the first planetary gear train, a second planetary gear train, and a no-back device.
Figure 10:
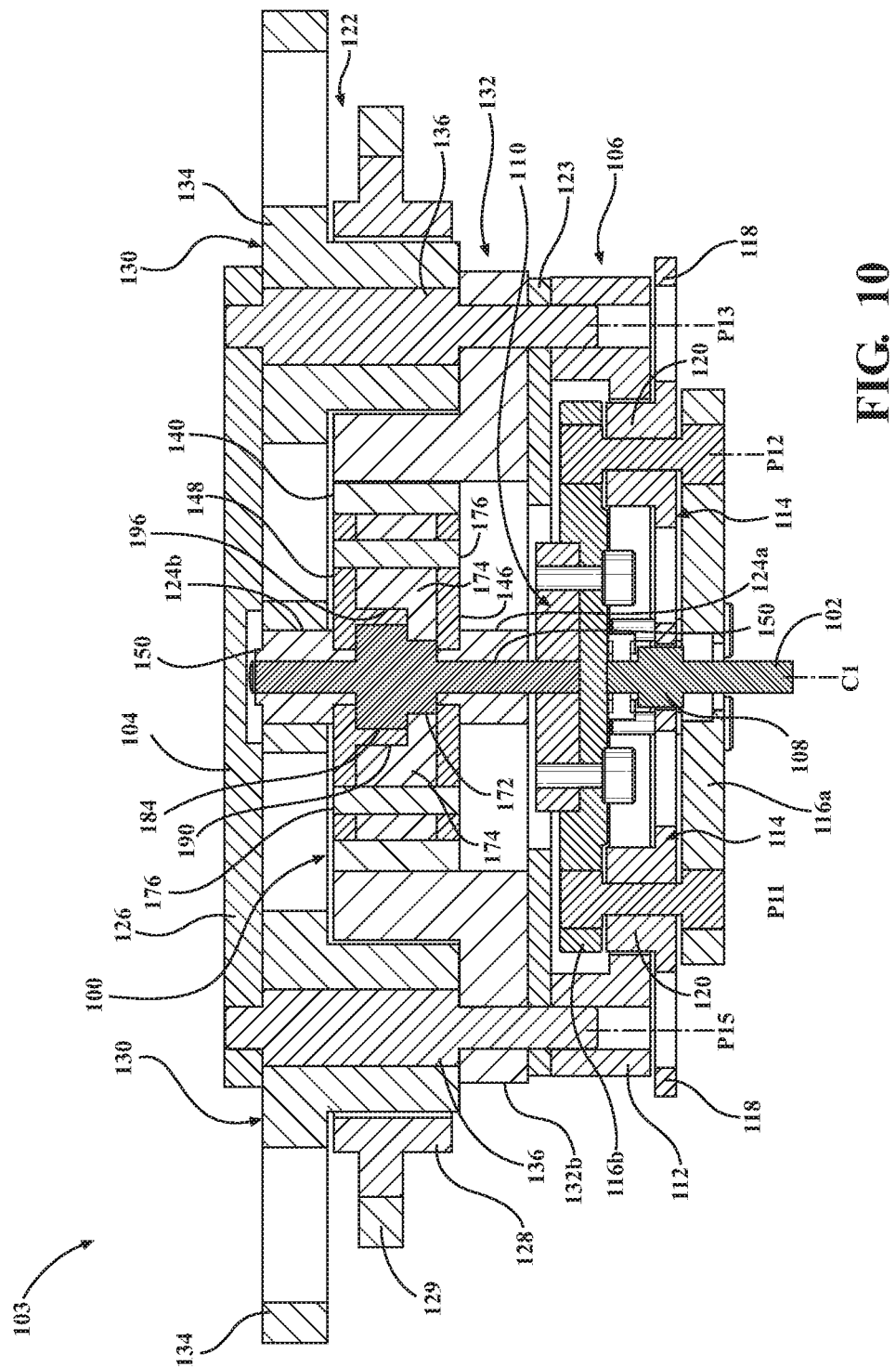
FIG. 10 is an elevational view illustrating a cross-section of FIG. 9.

As shown in FIGS. 9 and 10, the second planetary gear train 122 is coupled to the first planetary gear train 106 in sequence to further reduce the drive torque required to ultimately move the movable member 86. A no-back device 100 (see FIG. 10), described in detail further below (shown in detail in FIGS. 13A-15), is coupled to both the first planetary gear train 106 and the second planetary gear train 122 and is disposed between the first 106 and second 122 planetary gear trains. The no-back device 100 is coupled to the gear assembly 103 to permit movement of the movable member 86 through application of the drive torque and prevent back drive torque applied to the output element 104 from moving the movable member 86.

In alternative embodiments, the gear assembly 103 may comprise any number of planetary gear trains coupled in sequence in order to achieve a desired gear ratio.

As shown in FIG. 10, the second planetary gear train 122 comprises a first input gear 124a coupled to the no-back device 100 and a second input gear 124b coupled to the no-back device 100. As shown in FIGS. 9 and 10, the first input gear 124a is coupled to the no-back device 100 on a side facing the first planetary gear train 106 and the second input gear 124b is coupled to the no-back device 100 on a side facing the output element 104. The first and second input gears 124a, 124b are rotatable about the center axis C1 and fixed relative to each other about the center axis C1 during actuation. The second planetary gear train 122 further comprises an output member 126 rotatable about the center axis C1 and a gear arrangement operable between the input gears 124a, 124b and the output member 126. In this embodiment, the output element 104 is the output member 126 and is coupled to the movable member 86 (See FIG. 6). The movable member 86 is configured to move with the output member 126. The no-back device 100 is coupled to the output member 110 of the first planetary gear train 106 and the input gears 124a, 124b of the second planetary gear train 122.

In alternative embodiments, the output element 104 is another moving component of the gear arrangement connected to the movable member 86 and configured to move with the movable member 86.

Figure 11:
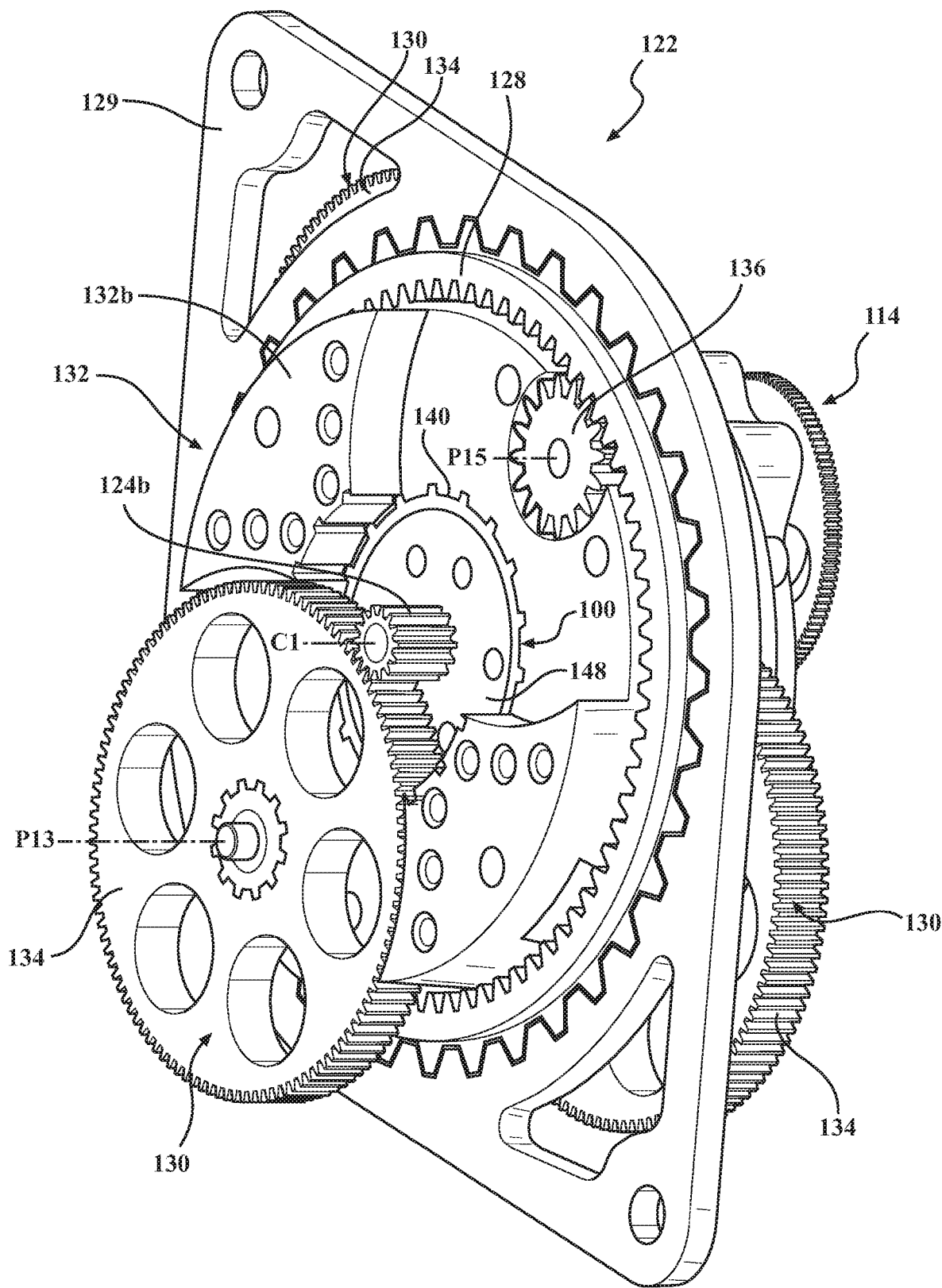
FIG. 11 is a perspective view of the second planetary gear train and the no-back device.
Figure 12:
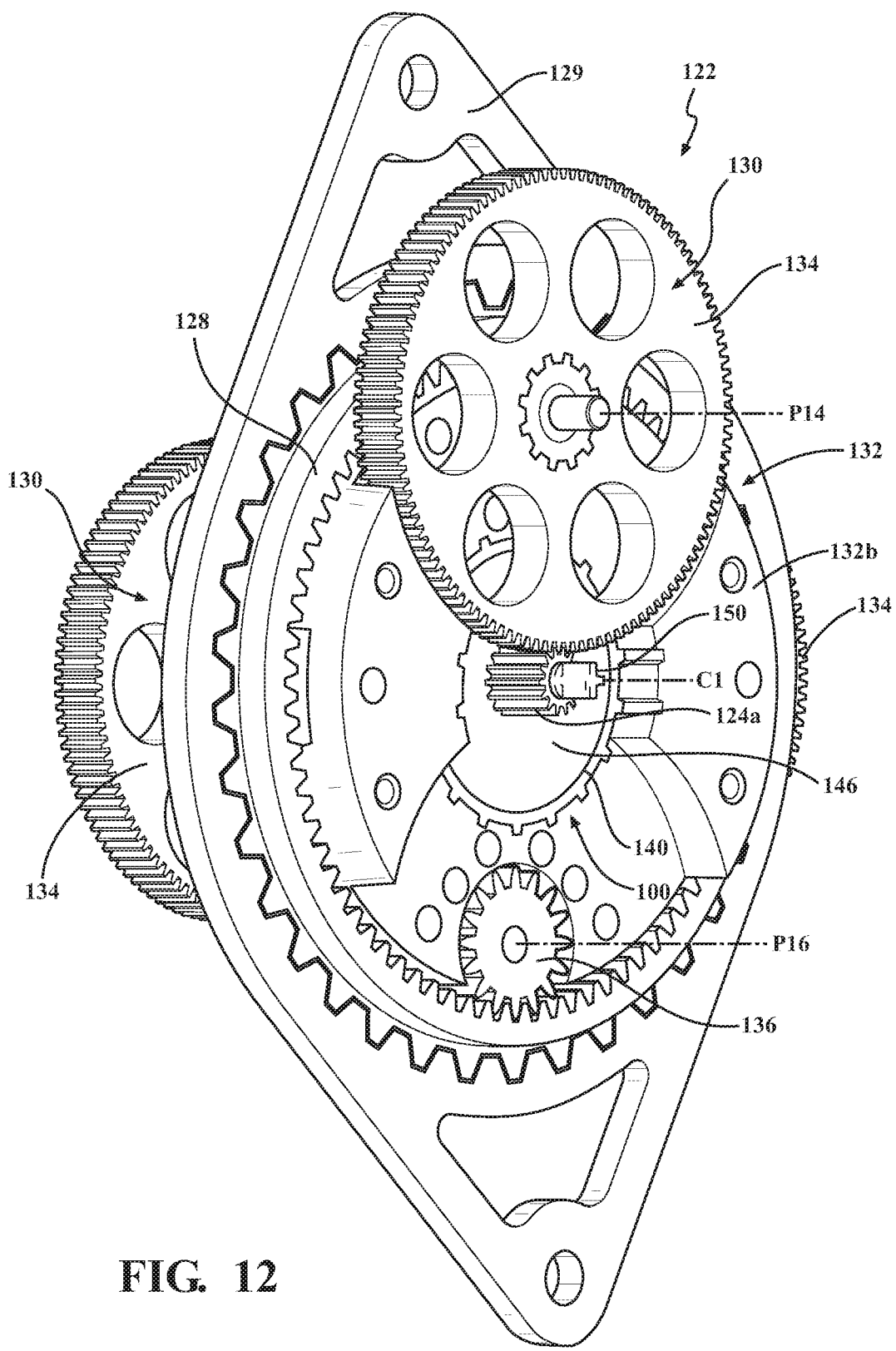
FIG. 12 is another perspective view of the second planetary gear train and the no-back device.

In one embodiment shown in FIGS. 10-12, the input gears 124*a*, 124*b* of the second planetary gear train 122 are sun gears rotatable about the center axis C1. In FIG. 11, the output member 126 of the second planetary gear train 122 is removed. In FIG. 12, the first planetary gear train 106 is removed to illustrate the no-back device 100 and the second planetary gear train 122. The gear arrangement of the second planetary gear train 122 comprises a fixed ring gear 128 disposed about the center axis C1 and fixed to the support frame 129 (removed in FIG. 10). The gear arrangement further comprises an array of planet gear clusters 130. The gear arrangement further comprises a carrier 132 rotatable about the center axis C1 relative to the input gears 124*a*, 124*b*. The carrier 132 comprises a plate, which in the embodiment shown forms the output member 126. The carrier 132 also comprises a carrier housing 132*b* coupled to the carrier plate.

The moving ring gear 112 of the first planetary gear train 106 is fixed to the carrier 132. More specifically, the moving ring gear 112 is fixed to the separating plate 123 and the separating plate 123 is fixed to the carrier 132 with the separating plate 123 being disposed between the moving ring gear 112 and the carrier 132. The carrier 132 retains the array of planet gear clusters 130 in direct meshing relationship with the input gears 124*a*, 124*b* and the fixed ring gear 128. The carrier 132 revolves the array of planet gear clusters 130 about the center axis C1.

As shown in FIGS. 11 and 12, the array of planet gear clusters 130 comprises first planet gears 134 spaced from each other and rotatable about respective planet gear axes P13, P14, P15, P16. In FIGS. 11 and 12, one first planet gear 134 is removed for illustration purposes. Each of the first planet gears 134 is disposed in direct meshing relationship with the input gears 124*a*, 124*b*. In the embodiments shown, the array of planet gear clusters 130 comprises four first planet gears 134. Two of the four first planet gears 134 are disposed on one side of the fixed ring gear 128 in direct meshing relationship with the first input gear 124*a*. The remaining two first planet gears 134 are disposed on another side of the fixed ring gear 128 in direct meshing relationship with the second input gear 124*b*. The first planet gears 134 are driven by the input gears 124*a*, 124*b* in unison such that rotation is equal between input gears 124*a*, 124*b* and between first planet gears 134 on either side of the fixed ring gear 128. In alternative embodiments, first planet gears 134 of the second planetary gear train 122 may be disposed on either side of the fixed ring gear 128 and in any combination thereof.

The array of planet gear clusters 130 comprises second planet gears 136 fixed to the first planet gears 134 to rotate with the first planet gears 134 about the planet gear axes P13, P14, P15, P16. Each of the second planet gears 136 is disposed in direct meshing relationship with the fixed ring gear 128. Further, by virtue of being rotatably supported in the carrier 132, the carrier 132 rotates about the center axis C1 while the planet gears 134, 136 revolve about the center axis C1 during actuation. As mentioned above, the output member 126 forms part of the carrier 132 in the embodiment shown. Thus, the output member 126 rotates about the center axis C1 while the planet gears 134, 136 revolve about the center axis C1. The planet gears 134, 136 may be integrally formed as shown in the figures. In alternative embodiments, the planet gears 134, 136 may be separate components fixed together.

The first planet gears 134 have physical configurations different from the second planet gears 136. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, and any combination thereof.

The first planet gears 134 have larger diameters and more teeth than the second planet gears 136. As a result of the first planet gears 134 having a greater number of teeth, a gear ratio between the input gears 124*a*, 124*b* and the output member 126 is increased. Said differently, as the number of teeth on the first planet gears 134 increase, the input gears 124*a*, 124*b* require a greater number of rotations to result in a single rotation of the output member 126.

In an alternative embodiment, the first planet gears 134 may be identical to the second planet gears 136. In still other embodiments, the array of planet gear clusters 130 may be an array of planet gears comprising only first planet gears 134 in direct meshing relationship with the input gears 124*a*, 124*b* and the fixed ring gear 128.

As mentioned above, the array of planet gear clusters 130 comprises four first planet gears 134. The array of planet gear clusters further comprises four second planet gears 136. In some embodiments, the array of planet gear clusters 130 comprises more than four first planet gears 134 and more than four second planet gears 136. In other embodiments, the array of planet gear clusters 130 comprises fewer than four first planet gears 134 and fewer than four second planet gears 136.

The no-back device 100 is coupled between the first 106 and second 122 planetary gear trains to prevent back drive. The actuator 101 is back driven when a load is applied externally to the movable member 86, which creates torque in opposition to the forward driving torque provided by the motor 92 that, if not checked, would otherwise rotate (in an opposite direction to the forward driving direction) the output element 104 relative to the fixed ring gear 128 of the second planetary gear train 122. The no-back device 100 described herein is responsive to drive torque applied by the motor 92 and operates in concert with the gear assembly 103 to transmit drive torque provided by the motor 92 across the gear assembly 103 to the output element 104 while also preventing backdriving of the gear assembly 103. In the embodiment shown, the no-back device 100 automatically operates without any separate electrical or electromechanical input.

There are many advantages to using an actuator that does not allow back drive. One advantage is regardless of power (e.g. torque caused by external loads) applied to the output element 104, the input element 102 will not rotate in response. This advantage is particularly beneficial for patient support apparatus applications. Returning to the fowler section 82 embodiment as an example, movement of the fowler section 82 is at least partially dependent on power being supplied to the motor 92 rather than as a result of a load being applied to the fowler section 82 such as via weight of a patient on the fowler section 82 or the fowler section 82 being manipulated by a patient as a result of sudden force applied to the fowler section 82. As another example, in the event the patient support apparatus 50 is being transported and the fowler section 82 collides with an external object, the fowler section 82 would not move from the position the fowler section 82 was in prior to the collision. It should be appreciated that brakes could still be employed as a redundant safety mechanism.

Figure 13A:
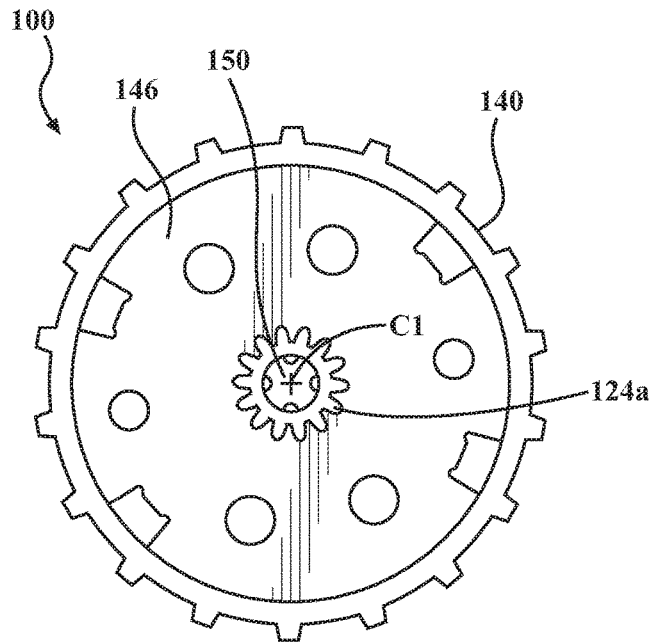
FIG. 13A is an elevational view of the no-back device.
Figure 13B:
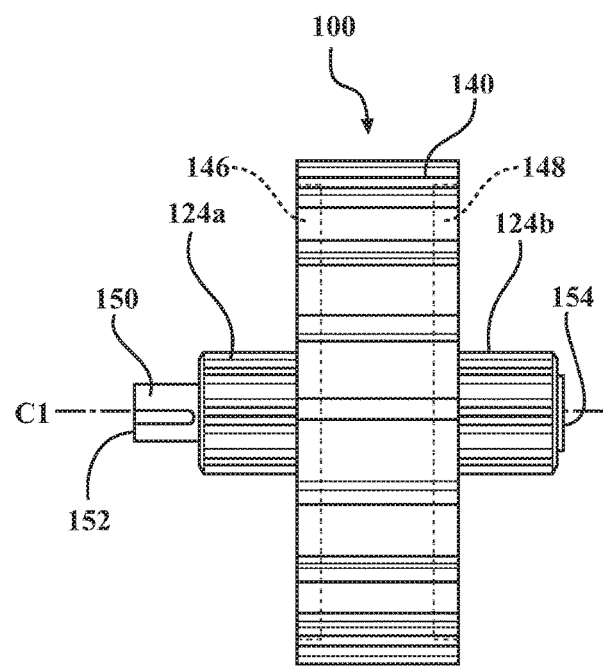
FIG. 13B is a side view of the no-back device.
Figure 13C:
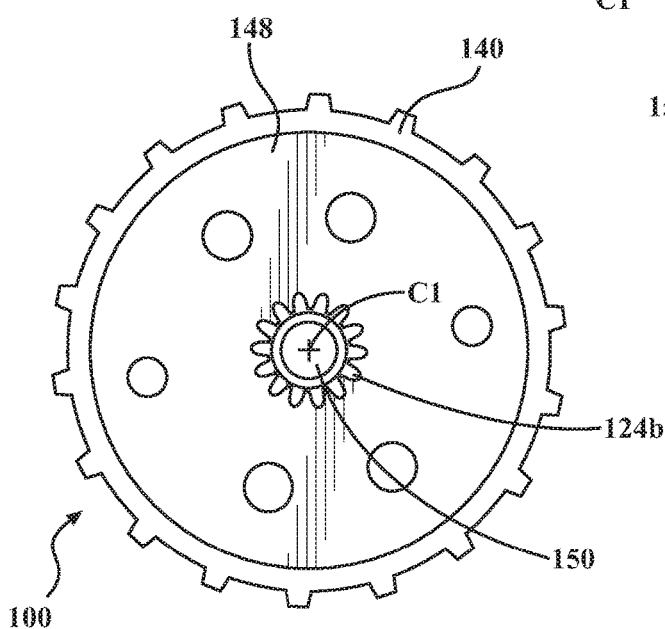
FIG. 13C is another elevational view of the no-back device.

In one embodiment shown in FIGS. 13A-13C, the no-back device 100 comprises an outer ring 140 fixed to the carrier 132 of the second planetary gear train 122 (as shown in FIGS. 11 and 12) and disposed about the center axis C1.

The outer ring 140 comprises an interior braking surface that defines an interior. The no-back device 100 further comprises a first plate 146 and a second plate 148 disposed within the interior and rotatable about the center axis C1. The first plate 146 and second plate 148 collectively form a housing that acts as a carrier for internal components of the no-back device 100. The first plate 146 is spaced from the second plate 148. The first plate 146 and the second plate 148 are fixed relative to each other. The first input gear 124*a* of the second planetary gear train 122 is fixed to the first plate 146 and the second input gear 124*b* of the second planetary gear train 122 is fixed to the second plate 148. In other embodiments, an alternative form of housing/carrier may be used.

The no-back device 100 further comprises a no-back input shaft 150 disposed along the center axis C1 with the no-back input shaft 150 passing through the first 146 and second 148 plates such that at least a portion of the no-back input shaft 150 is disposed within the interior. The no-back input shaft 150 defines a first end 152, a second end 154, and a length therebetween. In the embodiment shown, the first 152 and second 154 ends are disposed on opposite sides of the plates 146, 148 and a portion of the length of the no-back input shaft 150 is disposed within the interior. In alternative embodiments, the no-back input shaft 150 may pass through only the first plate 146 and the second end 154 may be disposed within the interior. The no-back input shaft 150 is rotatable relative to the outer ring 140 and is rotatable in a limited fashion relative to the plates 146, 148 and the input gears 124*a*, 124*b*, as described further below.

In one embodiment shown in FIGS. 14A-14D, the no-back device 100 comprises lock cams 156, 160 for braking and limiting the rotation of the plates 146, 148 relative to the outer ring 140, which ultimately brakes and limits undesired rotation of the movable member 86. These cams 156, 160 act as one possible form of braking assembly of the no-back device 100 with other forms of braking assemblies and braking elements being possible. The no-back device 100 shown comprises a first lock cam 156 disposed within the interior between the first 146 and second 148 plates. The first lock cam 156 is rotatably coupled to the second plate 148 via a first lock cam pin 158. The first lock cam pin 158 is fixed to the second plate 148. The no-back device 100 further comprises a second lock cam 160 disposed within the interior between the first 146 and second 148 plates. The second lock cam 160 is rotatably coupled to the second plate 148 via a second lock cam pin 162. The second lock cam pin 162 is fixed to the second plate 148. In the embodiments shown in FIGS. 14A-15, the no-back device 100 comprises two first lock cams 156 and two second lock cams 160. In alternative embodiments, the no-back device 100 may comprise one first lock cam 156 and one second lock cam 160. In still other embodiments, the no-back device 100 may comprise three or more first lock cams 156 and three or more second lock cams 160.

In another embodiment, the first 156 and second 160 lock cams are coupled to the first plate 146 rather than the second plate 148. As the first 146 and second 148 plates are fixed relative to each other, structure and function of the first 156 and second 160 lock cams would be identical in either orientation. In an alternative embodiment, the first 156 and second 160 lock cams are coupled to both the first 146 and second 148 plates.

The first lock cam 156 is configured to prevent clockwise rotation of the plates 146, 148 (and consequently, the input gears 124*a*, 124*b*) relative to the outer ring 140 and is hereinafter referred to as a clockwise lock cam or CW lock cam 156. The second lock cam 160 is configured to prevent counter-clockwise rotation of the plates 146, 148 (and consequently, the input gears 124*a*, 124*b*) relative to the outer ring 140 and is hereinafter referred to as a counter-clockwise lock cam or CCW lock cam 160. Clockwise and counter-clockwise directions are relative directions and refer to rotation of individual components of the no-back device 100 with respect to the views shown in FIGS. 14A-15.

The CW and CCW lock cams 156, 160 are configured to independently rotate about their respective lock cam pins 158, 162 between engaged 164, released 166, and overtravel 168 positions relative to the outer ring 140.

Figure 14A:
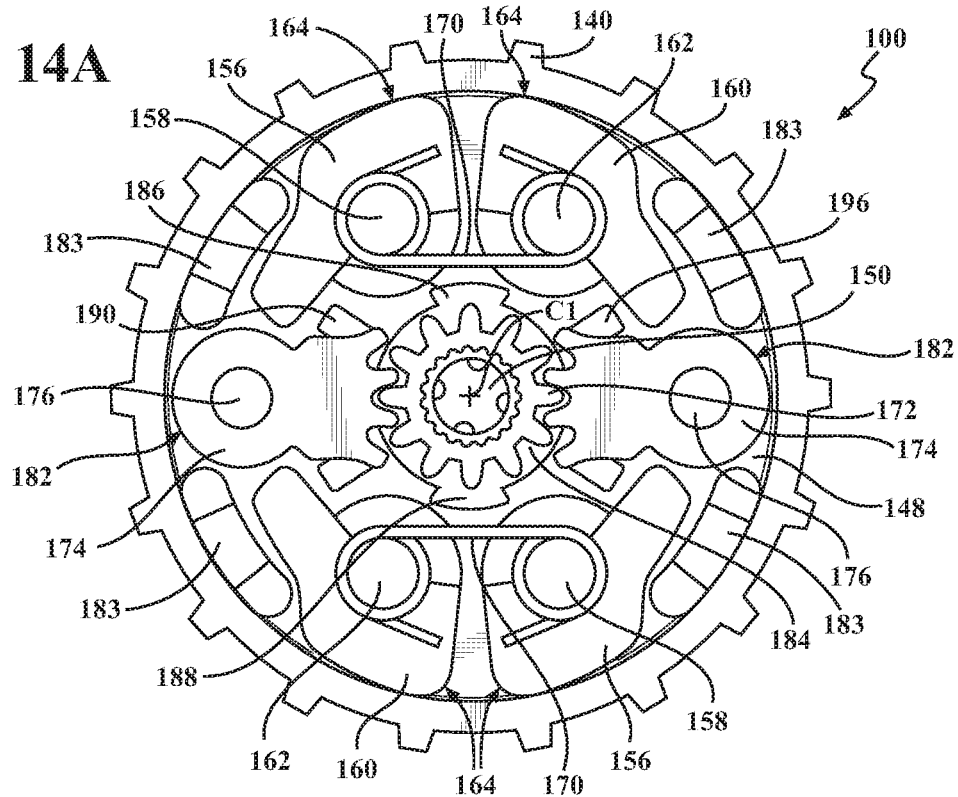
FIG. 14A is an elevational view of the no-back device in a neutral drive torque scenario.

As shown in FIG. 14A, both lock cams 156, 160 are in the engaged position 164. In the engaged position 164, the lock cams 156, 160 are in contact with the outer ring 140 such that friction between the lock cams 156, 160 and the outer ring 140 prevent the plates 146, 148 from rotating relative to the outer ring 140 either clockwise or counter-clockwise. More specifically, when the CW lock cams 156 are in the engaged position 164, the friction between the CW lock cams 156 and the outer ring 140 prevents the plates 146, 148 from rotating relative to the outer ring 140 in the clockwise direction, but does not prevent the plates 146, 148 from rotating in the counter-clockwise direction. When the CCW lock cams 160 are in the engaged position 164, the friction between the CCW lock cams 160 and the outer ring 140 prevents the plates 146, 148 from rotating relative to the outer ring 140 in the counter-clockwise direction, but does not prevent the plates 146, 148 from rotating in the clockwise direction.

Figure 14B:
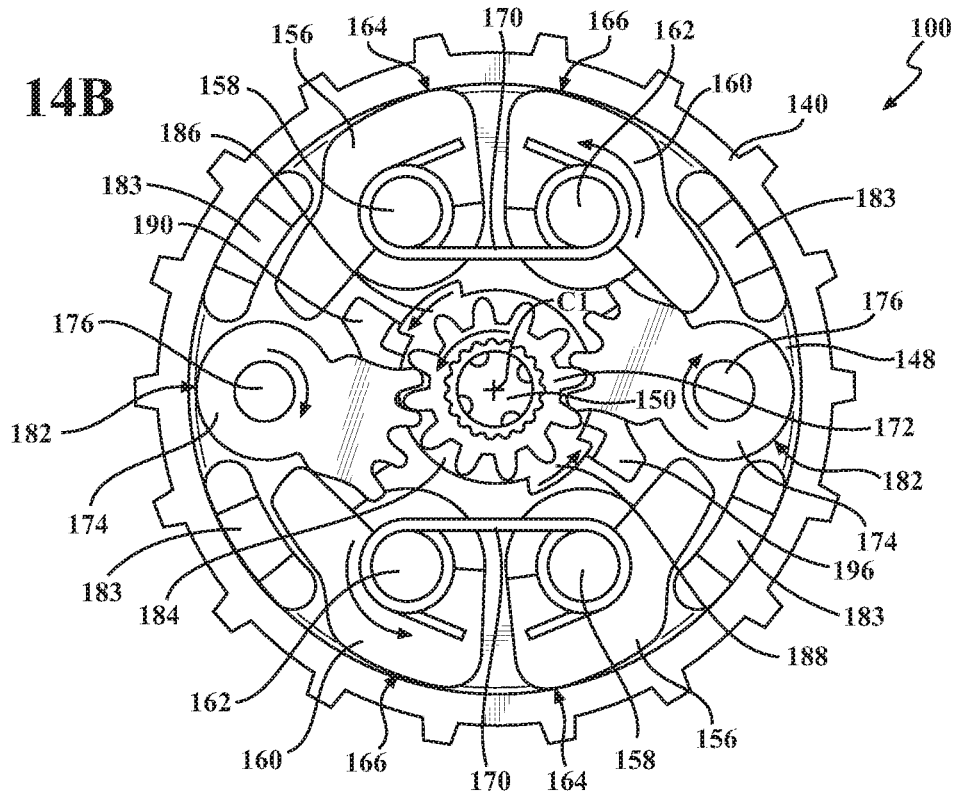
FIG. 14B is an elevational view of the no-back device in a drive torque opposing scenario.

As shown in FIG. 14B, the CCW lock cams 160 are in the released position 166. When the CCW lock cams 160 are in the released position 166, the CCW lock cams 160 are in contact with the outer ring 140, but are rotated slightly away from the outer ring 140 by geared cam drivers 174 as described further below. However, when the CCW lock cams 160 are in the released position 166 and the plates 146, 148 begin rotating in the counter-clockwise direction relative to the outer ring 140, the friction between the CCW lock cams 160 and the outer ring 140 rotates the CCW lock cams 160 back to the engaged position 164, preventing the plates 146, 148 from rotating relative to the outer ring 140 in a counter-clockwise direction. In FIG. 14B, the CW lock cams 156 remain in the engaged position 164, so that friction between the CW lock cams 156 and the outer ring 140 when the plates 146, 148 are rotated clockwise relative to the outer ring 140 is enough to prevent the clockwise movement of the plates 146, 148 relative to the outer ring 140. Although not shown in FIG. 14B, in other torque applying scenarios the CW lock cams 156 may be in the released position 166 and function in a similar manner to the CCW lock cams 160, but in the clockwise direction.

Figure 14C:
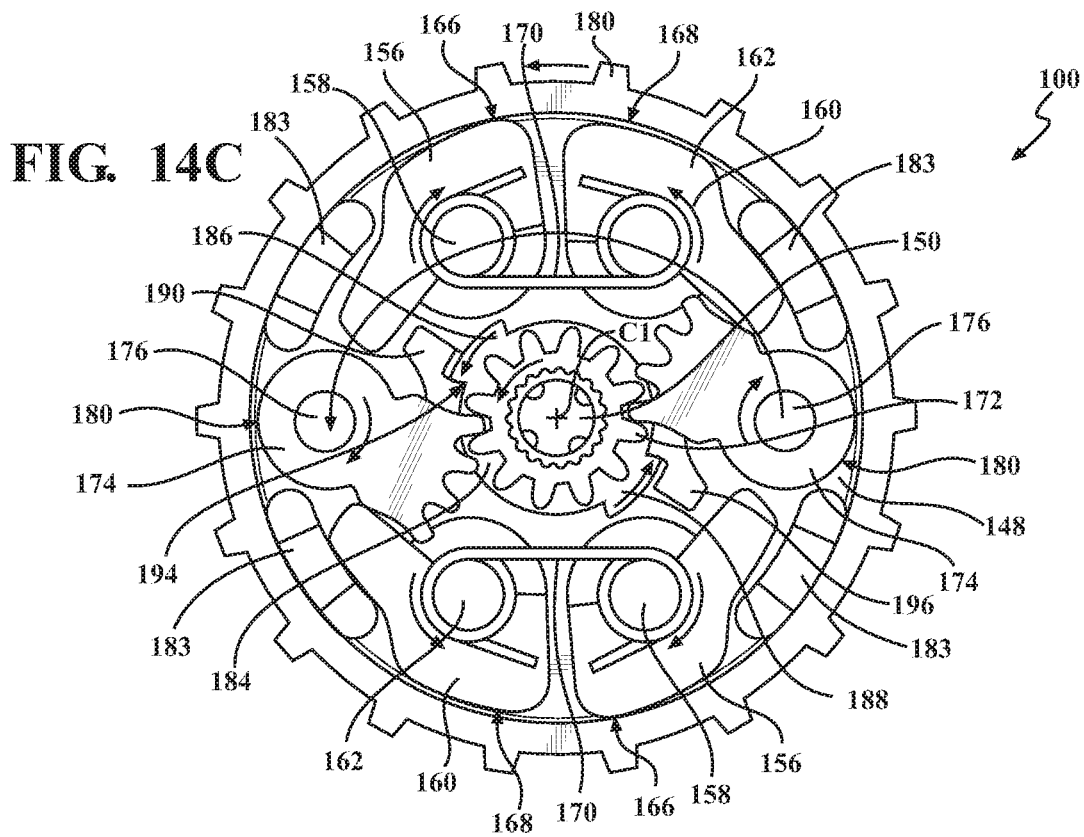
FIG. 14C is an elevational view of the no-back device in a second drive torque opposing scenario.

As shown in FIG. 14C, the CCW lock cams 160 are in the overtravel position 168 and the CW lock cams 156 are in the released position 166. When the CCW lock cams 160 are in the overtravel position 168, the CCW lock cams 160 are rotated away from the outer ring 140 by the geared cam drivers 174 such that the CCW lock cams 160 are not in contact with the outer ring 140. In this position, the CCW lock cams 160 do not prevent rotation of the plates 146, 148 relative to the outer ring 140 in either direction.

Figure 14D:
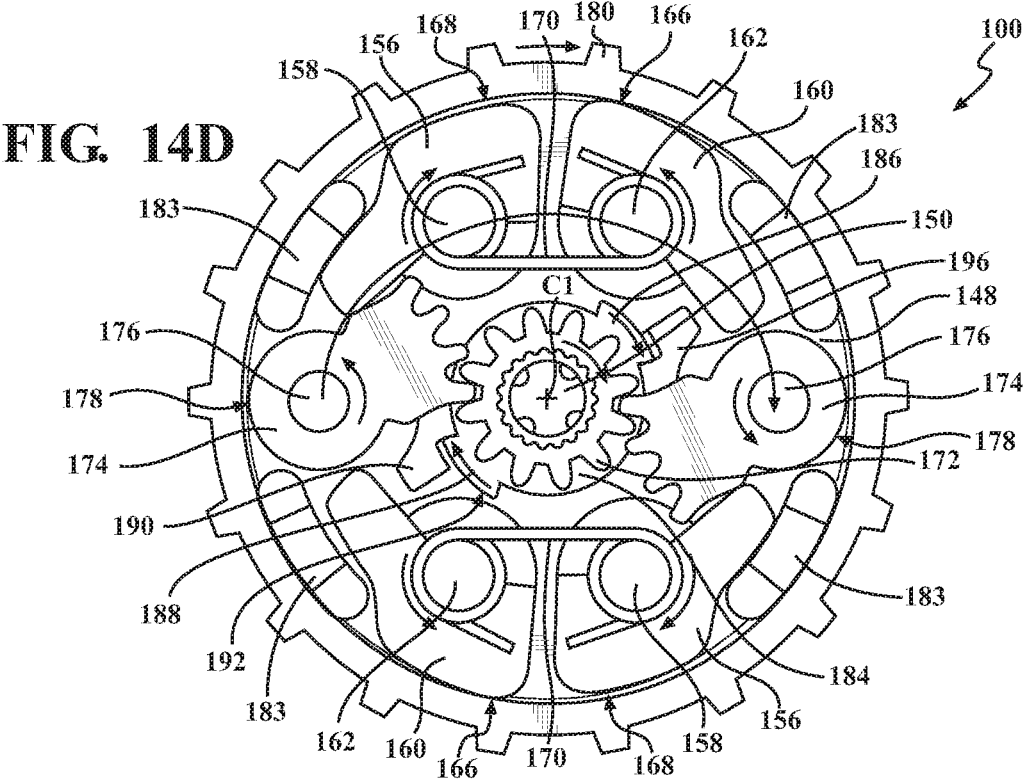
FIG. 14D is an elevational view of the no-back device in a third drive torque opposing scenario.

As shown in FIG. 14D, the CW lock cams 156 are in the overtravel position 168 and the CCW lock cams 160 are in the released position 166. When the CW lock cams 156 are in the overtravel position 168, the CW lock cams 156 are rotated away from the outer ring 140 by the geared cam drivers 174 such that the CW lock cams 156 are not in contact with the outer ring 140. In this position, the CW lock cams 156 do not prevent rotation of the plates 146, 148 relative to the outer ring 140 in either direction.

The no-back device 100 comprises a spring 170 to bias the lock cams 156, 160 into the engaged position 164. In alternative embodiments, another biasing mechanism may be used.

As shown in FIGS. 14A-14D, a geared cam drive gear 172 is fixed to the no-back input shaft 150 and disposed within the interior of the outer ring 140 between the first 146 and second 148 plates. Accordingly, the cam drive gear 172 rotates with the no-back input shaft 150, which, as previously described, is fixed to the output member 110 to rotate with the output member 110. The cam drive gear 172 is disposed about the no-back input shaft 150. The cam drive gear 172 is configured to rotate with the no-back input shaft 150 about the center axis C1.

The no-back device 100 further comprises the geared cam drivers 174 disposed within the interior and coupled to the second plate 148 via cam driver pins 176. The cam drive gear 172 and geared cam drivers 174 are configured to rotate in response to rotation of the no-back input shaft 150 to abut the lock cams 156, 160 and control movement of the lock cams 156, 160 between the engaged 164, released 166, and overtravel 168 positions. The cam driver pins 176 are fixed to the second plate 148. In the embodiments shown, the no-back device 100 comprises two geared cam drivers 174, one for each pair of CW and CCW lock cams 156, 160. In alternative embodiments, the no-back device 100 may comprise as many geared cam drivers 174 as there are pairs of CW and CCW lock cams 156, 160. The geared cam drivers 174 are disposed in meshing relationship with the cam drive gear 172 and configured to rotate about the cam driver pins 176 in response to rotation of the no-back input shaft 150 between a first position 178, a second position 180, and at least a third position 182 between the first 178 and 180 second positions.

As shown in FIG. 14D, the geared cam drivers 174 are in the first position 178. In the first position 178, the geared cam drivers 174 abut the CW lock cams 156 with sufficient force to oppose the force of the springs 170 such that the CW lock cams 156 are rotated from the engaged position 164, through the released position 166, and into the overtravel position 168.

As shown in FIG. 14C, the geared cam drivers 174 are in the second position 180. In the second position 180, the geared cam drivers 174 abut the CCW lock cams 160 with sufficient force to oppose force from the springs 170 such that the CCW lock cams 160 are rotated from the engaged position 164, through the released position 166, and into the overtravel position 168.

As shown in FIGS. 14A and 14B, the geared cam drivers 174 are in the third position 182 or one of the intermediate positions 182. In the intermediate position 182 of FIG. 14A, the geared cam drivers 174 do not abut any of the lock cams 156, 160, but merely rests between the lock cams 156, 160. In the intermediate position 182 of FIG. 14B, the geared cam drivers 174 abut the CCW lock cams 160 such that the CCW lock cams 160 are in the released position 166, but the CCW lock cams 160 cannot reach the overtravel position 168 until the geared cam drivers 174 are in the second 180 position (see FIG. 14C).

In another embodiment, the geared cam drivers 174 are coupled to the first plate 146 rather than the second plate 148. As the first 146 and second 148 plates are fixed relative to each other, structure and function of the geared cam drivers 174 are identical in either orientation. In an alternative embodiment, the geared cam drivers 174 are coupled to both the first 146 and second plates 148.

The no-back device 100 further comprises stops 183 fixed to the first 146 and second 148 plates and disposed between the first 146 and second 148 plates. The stops are configured to provide rigidity between the first 146 and second 148 plates and limit the lock cams 156, 160 from rotating past the overtravel position 168. In actuation, when the geared cam drivers 174 reach the first 178 or second 180 position, the geared cam drivers 174 are restricted from rotating further by the stops 183 which are abutting the lock cams 156, 160 in the opposite direction when the geared cam drivers 174 are in the first 178 or second 180 position, which restricts the rotation of the cam drive gear 172 relative to the plates 146, 148. In an alternative embodiment, the stops 183 are integrated with the first 146 and/or second 148 plates. In another embodiment, the no-back device 100 comprises three or fewer stops 183. In other embodiments, the no-back device 100 comprises five or more stops 183. In still other embodiments, the no-back device 100 comprises as many stops as there are lock cams 156, 160.

Below, various components of the no-back device 100 are described that limit rotation of the no-back input shaft 150 relative to the plates 146, 148 and work in concert with the above described components of the no-back device 100 to permit movement of the movable member 86 resulting from forward drive torque and to prevent movement of the movable member 86 resulting from back drive torque.

As shown in FIGS. 14A-14D, a drive dog 184 is fixed to the no-back input shaft 150 and disposed within the interior of the outer ring 140 between the first 146 and second 148 plates. More specifically, the drive dog 184 is disposed about the no-back input shaft 150 and between the second plate 148 and the cam drive gear 172. The drive dog 184 is configured to rotate with the no-back input shaft 150 and the cam drive gear 172 about the center axis C1. The drive dog 184 comprises a first 186 and a second 188 protrusion extending radially outward from the center axis C1 and the no-back input shaft 150.

The function of the drive dog 184 is to engage the plates 146, 148 in a manner that causes concurrent rotation of the plates 146, 148 and the no-back input shaft 150 in response to rotation of the no-back input shaft 150. As previously described, the no-back input shaft 150 is fixed to drive dog 184, but is not fixed to the plates 146, 148. The drive dog 184 essentially interconnects the no-back input shaft 150 to the plates 146, 148 under certain conditions so that rotation of the no-back input shaft 150 causes rotation of the plates 146, 148.

The second plate 148 comprises bosses 190, 196 fixed to the second plate 148 and extending into the interior towards the first plate 146. The bosses 190, 196 are radially spaced from the center axis C1 between the no-back input shaft 150 and the cam driver pins 176. More specifically, the bosses 190, 196 are disposed between the second plate 148 and the geared cam drivers 174.

The bosses 190, 196 and the protrusions 186, 188 of the drive dog 184 work in conjunction to interconnect rotation of the no-back input shaft 150 to the plates 146, 148. The drive dog 184 is rotatable relative to the plates 146, 148 between a clockwise position 192 (see FIG. 14D) where the protrusions 186, 188 abut the bosses 190, 196 on one side, a counter-clockwise position 194 (See FIG. 14C) where the protrusions 186, 188 abuts the bosses 190, 196 on an opposite side, and at least one position between the clockwise position 192 and the counter-clockwise position 194 (See FIG. 14B). Engagement between the protrusions 186, 188 and the bosses 190, 196 operates to interconnect the no-back input shaft 150 to the plates 146, 148 so that rotation of the no-back input shaft 150 causes rotation of the plates 146, 148. In positions between the clockwise position 192 and the counter-clockwise position 194, the no-back input shaft 150 and plates 146, 148 are able to move relative to one another in either the clockwise or counter-clockwise directions.

As shown in FIG. 14D, the drive dog 184 is in the clockwise position 192 with the protrusions 186, 188 abutting the bosses 190, 196 on one side so that clockwise rotation of the no-back input shaft 150 results in like clockwise rotation of the plates 146, 148.

As shown in FIG. 14C, the drive dog 184 is in the counter-clockwise position 194 with the protrusions 186, 188 abutting the bosses 190, 196 on the opposite side so that counter-clockwise rotation of the no-back input shaft 150 results in like counter-clockwise rotation of the plates 146, 148.

As shown in FIG. 14A, the drive dog 184 is in a position between the clockwise position 192 and the counter-clockwise position 194, such that the protrusions 186, 188 are not abutting the bosses 190, 196. In this "home" position in FIG. 14A there is no forward drive torque applied. As a result, starting from this "home" position any rotation of the no-back input shaft 150 caused by forward drive torque in either the clockwise or counter-clockwise direction is relative to the plates 146, 148 until the protrusions 186, 188 of the drive dog 184 engage one side of the bosses 190, 196 thereby interconnecting rotation of the no-back input shaft 150 to the plates 146, 148.

In an alternative embodiment, a single boss could be employed to abut both the first 186 and second 188 protrusions. In another embodiment, the drive dog 184 may comprise one protrusion and the second plate 148 may comprise a first and a second boss. The first boss may limit the rotation of the no-back input shaft 150 in the clockwise direction relative to the plates 146, 148 and the second boss may limit the rotation of the no-back input shaft 150 in the counter-clockwise direction relative to the plates 146, 148.

The degree to which the no-back input shaft 150 is permitted to rotate relative to the plates 146, 148 before the protrusions 186, 188 engage the bosses 190, 196 is dependent on spacing between the protrusions 186, 188 of the drive dog 184 and the bosses 190, 196. The spacing between the protrusions 186, 188 of the drive dog 184 and the bosses 190, 196 is designed to accommodate at least a degree of rotation required to rotate the geared cam drivers 174 between the first 178 and second positions 180. In other words, neither of the protrusions 186, 188 of the drive dog 184 engage the bosses 190, 196 to rotate the plates 146, 148 with the with the input shaft 150 until the input shaft 150 has rotated the geared cam drivers 174, through rotation of the cam drive gear 172, to at least one of the first positions 178 and the second positions 180.

By way of example and as shown in FIGS. 14A-14C, the various positions of the above described components in the no-back device 100 are related.

Beginning with FIG. 14A, in the "home" position, the drive dog 184 begins in the position between the clockwise position 192 and the counter-clockwise position 194 where neither the first 184 nor the second 186 protrusions abuts the bosses 190, 196. The geared cam drivers 174 are in the intermediate position 182 between the first 178 and second 180 positions, and none of the CW lock cams 156 nor the CCW lock cams 160 are in the overtravel position 168, respectively. The geared cam drivers 174 are not abutting either of the lock cams 156, 160 and therefore not providing any force to counter the force of the springs 170 on any of the CW lock cams 156 and the CCW lock cams 160. Thus, the CW lock cams 156 and CCW lock cams 160 remain in the engaged position 164 with the outer ring 140 to fully brake movement of the plates 146, 148 relative to the outer ring 140.

In FIG. 14B, the no-back input shaft 150 has been rotated counter-clockwise relative to the outer ring 140 and the plates 146, 148. The drive dog 184 has rotated counter-clockwise with the no-back input shaft 150 (since they are fixed together), but remains in the position between the clockwise position 192 and the counter-clockwise position 194. The cam drive gear 172 has rotated with the no-back input shaft 150 and the drive dog 184. The cam drive gear 172 has rotated the geared cam drivers 174 closer to the second position 180, however, the geared cam drivers 174 remain in the intermediate position 182 between the first 178 and second 180 positions, as none of the CW lock cams 156 nor the CCW lock cams 160 are in the overtravel position 168. The geared cam drivers 174 are abutting the CCW lock cams 160 and providing enough force to counter the force of the springs 170 and slightly rotate the CCW lock cams 160 into the released position 166, where the CCW lock cams 160 are still in contact with the outer ring 140, but slightly rotated away from the engaged position 164. The CW lock cams 156 remain in the engaged position 164. In the condition shown in FIG. 14B, any back drive torque which might be applied to the outer ring 140 and plates 146, 148, which in the absence of the no-back device 100 would allow the outer ring 140 and plates 146, 148 to rotate in the clockwise direction, yet at different rotational speeds relative to each other, would be braked by the CW lock cams 156.

In FIG. 14C, the no-back input shaft 150 has been rotated further counter-clockwise relative to the outer ring 140 and the plates 146, 148. The drive dog 184 has rotated counter-clockwise with the no-back input shaft 150 and is in the counter-clockwise position 194, where the protrusions 186, 188 abut the bosses 190, 196. The cam drive gear 172 has rotated with the no-back input shaft 150 and the drive dog 184. The cam drive gear 172 moved the geared cam drivers 174 into the second position 180, where the CCW lock cams 160 are rotated into the overtravel position 168. Now, with the protrusions 186, 188 abutting the bosses 190, 196, when the no-back input shaft 150 rotates further counter-clockwise, the plates 146, 148 are configured to also rotate counter-clockwise with the no-back input shaft 150 relative to the outer ring 140.

FIG. 14D is similar to FIG. 14C except that the no-back input shaft 150 has been rotated further clockwise relative to the outer ring 140 and the plates 146, 148. The drive dog 184 has rotated clockwise with the no-back input shaft 150 and is in the clockwise position 192, where the protrusions 186, 188 abut the bosses 190, 196 on the opposite side. The cam drive gear 172 has rotated with the no-back input shaft 150 and the drive dog 184. The cam drive gear 172 moved the geared cam drivers 174 into the first position 178, where the CW lock cams 156 are rotated into the overtravel position 168. Now, with the protrusions 186, 188 abutting the bosses 190, 196, when the no-back input shaft 150 rotates further clockwise, the plates 146, 148 are configured to also rotate clockwise with the no-back input shaft 150 relative to the outer ring 140.

In operation, the motor 92 is configured to rotate the input gear 108 of the first planetary gear train 106 about the center axis C1, which rotates the output member 110 of the first planetary gear train 106 through the gear arrangement of the first planetary gear train 106, which rotates the no-back input shaft 150, which rotates the plates 146, 148 (once the no-back input shaft 150 has been interconnected to the plates 146, 148 to cause their rotation), which rotates the input gears 124a, 124b of the second planetary gear train 122 about the center axis C1, which rotates the output member 126 of the second planetary gear train 122 about the center axis C1 and moves the movable member 86 relative to the base 54.

FIGS. 14A-15 illustrate various scenarios when the relationship between forward drive torque and back drive torque changes. In order to simplify the explanation, in each of the scenarios forward drive torque will be applied to the no-back input shaft 150 from the motor 92 through the first planetary gear train 106 and back drive torque will be applied to the outer ring 140 of the no-back device 100 from the movable member 86, which is fixed to the carrier 132 of the second planetary gear train 122 and the outer ring 140. It is to be appreciated that the forward drive torque available at the no-back input shaft 150 is greater than the initial drive torque provided by the motor 92 as a result of the gear reduction inherent in the first planetary gear train 106. It is also to be appreciated that the back drive torque available at the outer ring 140 to oppose the forward drive torque is less than the initial back drive torque externally applied to the movable member 86 as a result of gear reduction inherent in the second planetary gear train 122.

As shown in FIG. 14A, the drive torque is neutral and the CW and CCW lock cams 156, 160 are in the engaged position 164. When back drive torque is applied in either direction, the CW and CCW lock cams 156, 160 oppose any movement of the plates 146, 148.

As shown in FIG. 14B, forward drive torque is applied to the no-back input shaft 150 in the counter-clockwise direction. If the no-back input shaft 150 continues to rotate in the counter-clockwise direction, and the forward drive torque at the no-back device 100 is greater than the back drive torque at the no-back device 100, then the no-back input shaft 150 and consequently the output member 126 of the second planetary gear train 122 will also rotate in the counter-clockwise direction.

As shown in FIG. 14C, forward drive torque is applied to the no-back input shaft 150 in the counter-clockwise direction and, due to the engagement of the protrusions 186, 188 of the drive dog 184 with the bosses 190, 196, forward drive torque is being applied to the plates 146, 148. In this scenario, the CCW lock cams 160 are in the overtravel position 168 and the forward drive torque drives the no-back input shaft 150, the plates 146, 148, and consequently the output member 126 of the second planetary gear train 122 in the counter-clockwise direction. While the plates 146, 148 are rotating counter-clockwise relative to the outer ring 140 (although both are moving counter-clockwise,) the plates 146, 148 move at a greater rotational speed and the CW lock cams 156 are in the released position 166 dragging against the outer ring 140 from the force of the springs 170 applied to the CW lock cams 156. If the forward drive torque ceases, friction between the CW lock cams 156 and the outer ring 140 will rotate the CW lock cams 156 to the engaged position 164.

As shown in FIG. 14D, forward drive torque is applied to the no-back input shaft 150 in the clockwise direction and, due to the engagement of the protrusions 186, 188 of the drive dog 184 with the bosses 190, 196, forward drive torque is being applied to the plates 146, 148. In this scenario, the CW lock cams 156 are in the overtravel position 168 and the forward drive torque drives the no-back input shaft 150, the plates 146, 148, and consequently the output member 126 of the second planetary gear train 122 in the clockwise direction. While the plates 146, 148 are rotating clockwise relative to the outer ring 140 (although both are moving counter-clockwise,) the plates 146, 148 move at a greater rotational speed and the CCW lock cams 160 are in the released position 166 dragging against the outer ring 140 from the force of the springs 170 applied to the CCW lock cams 160. If the forward drive torque ceases, friction between the CCW lock cams 160 and the outer ring 140 will rotate the CCW lock cams 160 to the engaged position 164.

As shown in FIG. 15, forward drive torque is applied to the no-back input shaft 150 in the clockwise direction, yet a clockwise back drive torque, i.e., an aiding back drive torque, is applied such that the plates 146, 148 begin rotating faster than the no-back input shaft 150. In this condition, the no-back device 100 is configured to act as a variable brake to arrest this increase in rotational speed of the plates 146, 148. Otherwise, movement of the movable member 86 could be unpredictable. In this condition, the CW lock cams 156 are no longer in the overtravel position 168 because the geared cam drivers 174 have moved out of the first position 178. The result is that the CW lock cams 156 will now slip along the outer ring 140 similar to a variable brake causing a frictional force opposing the aiding back drive torque to arrest the aiding back drive torque. As the forward drive torque increases relative to the aiding back drive torque, the braking between the CW lock cams 156 and the outer ring 140 decreases. As the forward drive torque decreases relative to the aiding back drive torque, the braking between the CW lock cams 156 and the outer ring 140 increases. Thus, the rotary actuator 101 can be operated in a controlled manner, even in the event of aiding back drive torques to provide a more predictable and consistent operation and movement of the movable member 86 across various loading conditions.

The geared cam drivers 174 reduce the abruptness and release/engagement rate of the lock cams 156, 160 in response to rotation of the no-back input shaft 150 relative to the plates 146, 148. The rate of release/engagement is matched to the self engagement rate of the lock cams 156, 160 resulting from friction between the lock cams 156, 160 and the outer ring 140, inertia of the back drive force application, and elastic deflection inherent in the rotary actuator 101 and the patient support apparatus 50.

The no-back device 100 is coupled between the first planetary gear train 106 and the second planetary gear train 122. In alternative embodiments, the no-back device 100 is coupled to the gear assembly 103 and the motor 92. The no-back input shaft 150 may be coupled directly to the motor 92 and the no-back device 100 may receive forward drive torque directly from the motor 92. The plates 146, 148 may be fixed to the input gear 108 of the first planetary gear train 106 and the no-back device 100 would still be configured to oppose back drive torque and prevent the actuator 101 from being back driven. In another embodiment, the no-back device 100 may be coupled directly to the movable member 86 and the output member 126 of the second planetary gear train 122. The no-back input shaft 150 may receive forward drive torque from the motor 92 through the first 106 and second 122 planetary gear trains. The plates 146, 148 may be fixed to the movable member 86 and the no-back device 100 would still be configured to oppose back drive torque and prevent the rotary actuator 101 from being back driven. In still other embodiments, only one planetary gear train is used. In other embodiments, an alternative gear assembly other than a planetary gear train is used.

In some embodiments, the no-back device 100 may incorporate features of a sprag clutch, a roller clutch, or another rotation limiting device in place of or in addition to the above described components of the no-back device 100.

Figure 16:
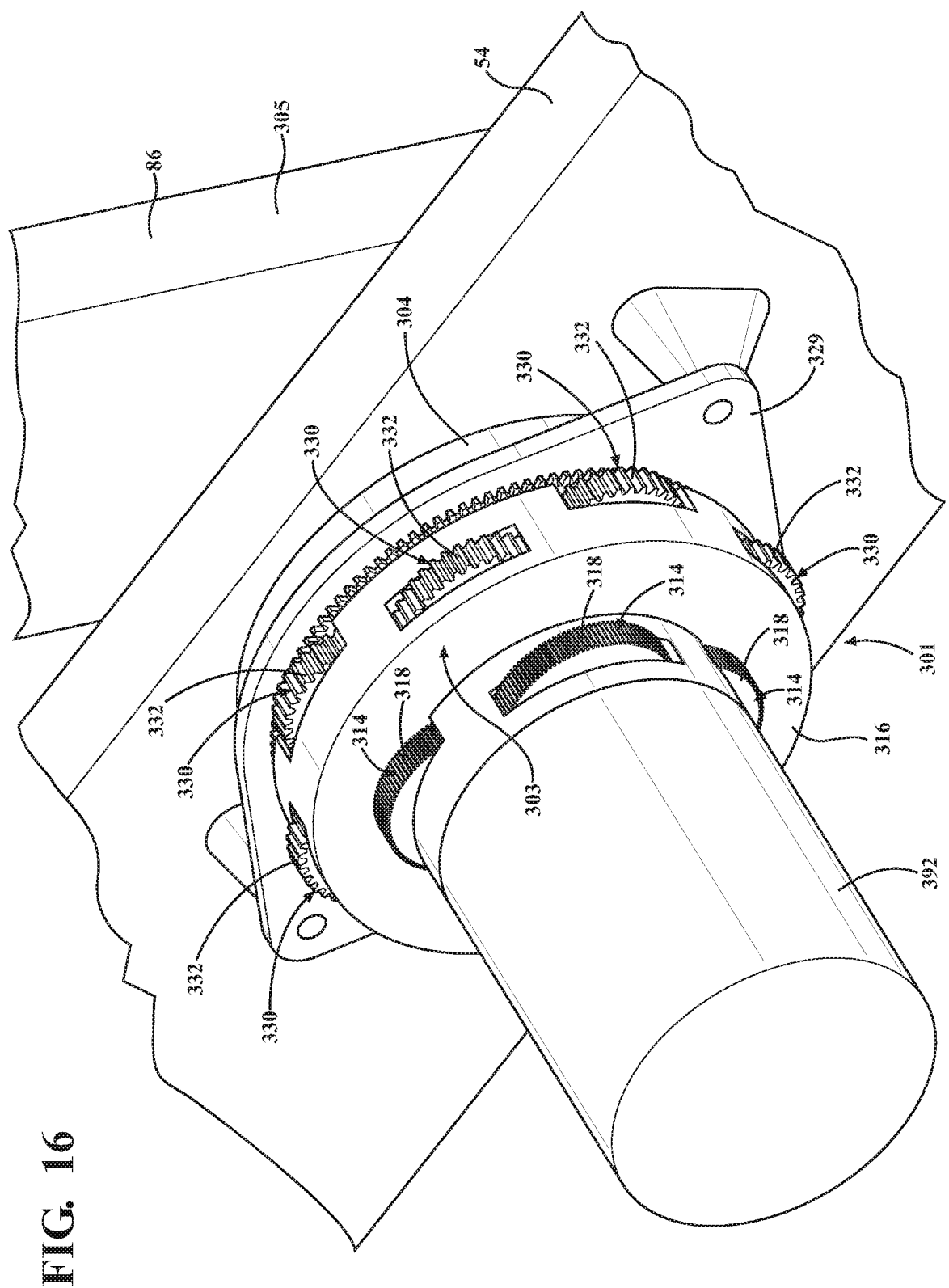
FIG. 16 is a perspective view of a rotary actuator coupled to a lift arm and a base of the patient support apparatus.

As shown in FIG. 16, another embodiment of one of the actuators 78, referenced as actuator 301, is shown for use in moving a lift arm 305 relative to the base 54. The lift arm 305 is another example of a movable member 86. The actuator 301 comprises a motor 392. The motor 392 provides power for the actuator 301. The motor 392 may be an electric motor, a hydraulic motor, or any other motor adapted to provide power for the actuator 301. The actuator 301 shown in FIG. 16 is arranged to pivot the movable member 86 relative to the base 54 about center axis C3. In the embodiment shown, the movable member 86 (lift arm 305) articulates relative to the base 54 to move the movable member 86 (lift arm 305) relative to the base 54. The actuator 301 further comprises a support frame 329 fixed to the base 54.

Figure 17:
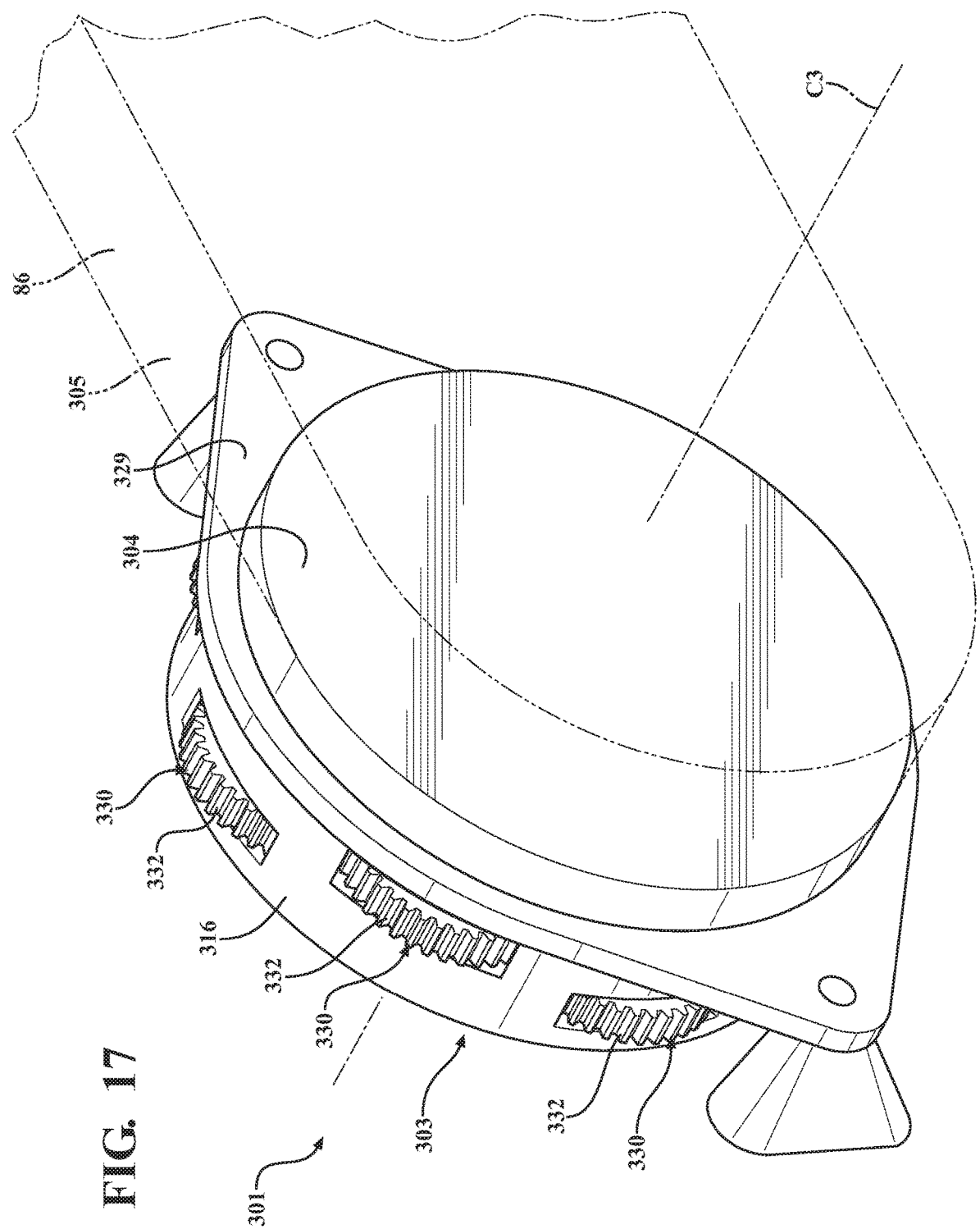
FIG. 17 is another perspective view of the rotary actuator of FIG. 16.
Figure 18:
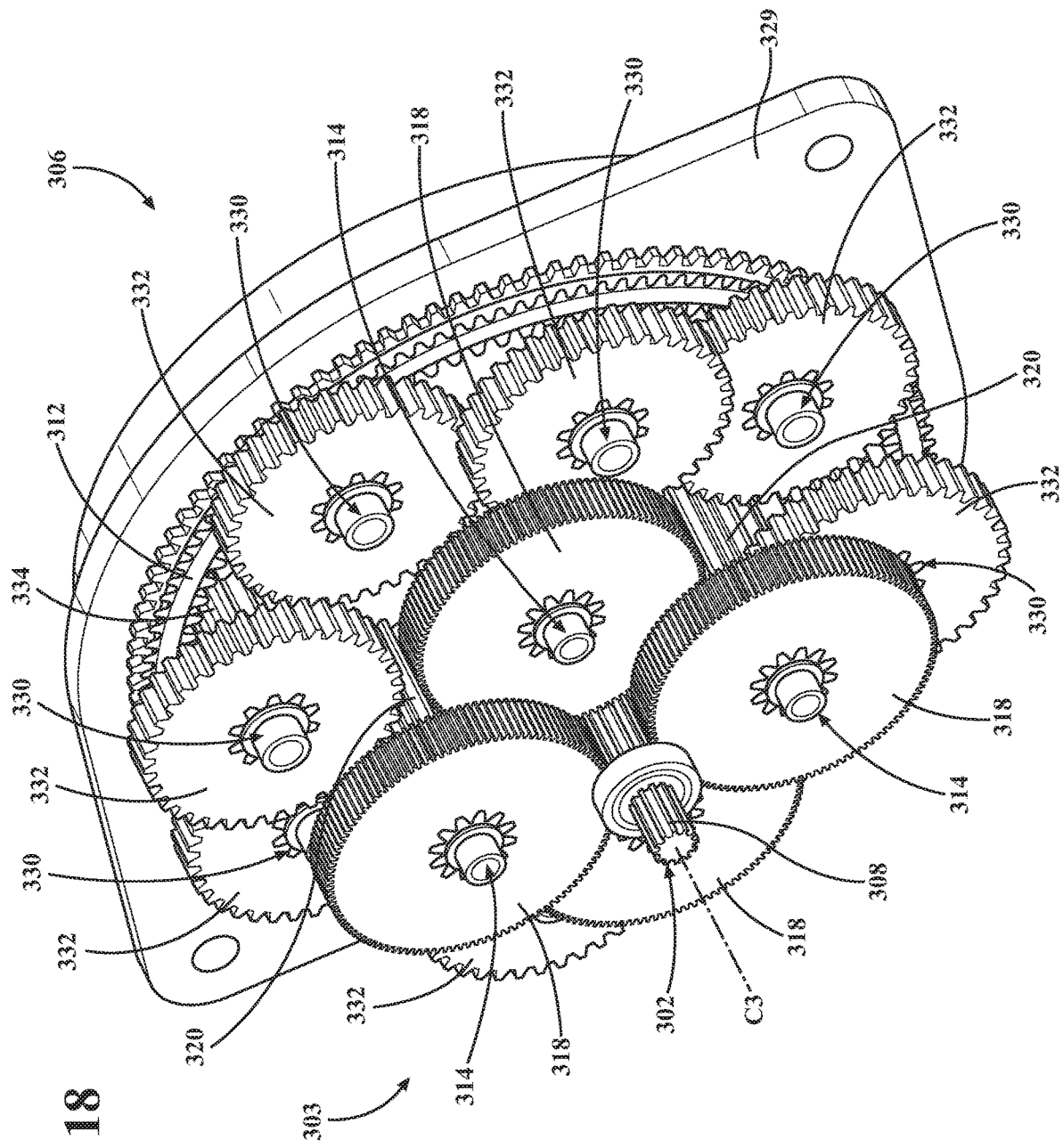
FIG. 18 is a perspective view of a planetary gear train of the rotary actuator of FIG. 16.

Opposing sides of the actuator 301 are shown in FIGS. 17 and 18. The actuator 301 comprises a gear assembly 303 having an input element 302 (FIG. 18) and an output element 304 (FIG. 17) connected to the movable member 86. The gear assembly 303 further comprises a gear arrangement operable between the input element 302 and the output element 304. Power from the motor 392 translates to torque that is transmitted to the input element 302, through the gear arrangement, and results in rotation of the output element 304.

In one embodiment, the gear assembly 303 comprises a planetary gear train 306 (see FIG. 18). It should be noted that in many of the figures described herein certain components of the actuator 301 and the gear assembly 303 have been removed for convenience of description and ease of illustration. Additionally, bearings, bushings or other members used to rotatably support parts of the gear assembly 303 are shown in the figures, but not described in detail as their utilization and function are well understood by those skilled in the art. As shown in FIG. 18, the planetary gear train 306 comprises an input gear 308 rotatable about the center axis C3. In this embodiment, the input element 302 comprises the input gear 308 and the input gear 308 is configured to receive drive torque from the motor 392. The input gear 308 comprises a sun gear rotatable about the center axis C3. The gear arrangement comprises a ring gear 312 disposed about the center axis C3. The ring gear 312 is fixed relative to the support frame 329.

The gear arrangement further comprises a first array of planet gear clusters 314 in meshing engagement with the sun gear and a second array of planet gear clusters 330 in meshing engagement with the first array of planet gear clusters 314 such that rotation of the sun gear results in rotation of the first array of planet gear clusters 314, which results in rotation of the second array of planet gear clusters 330.

Figure 19:
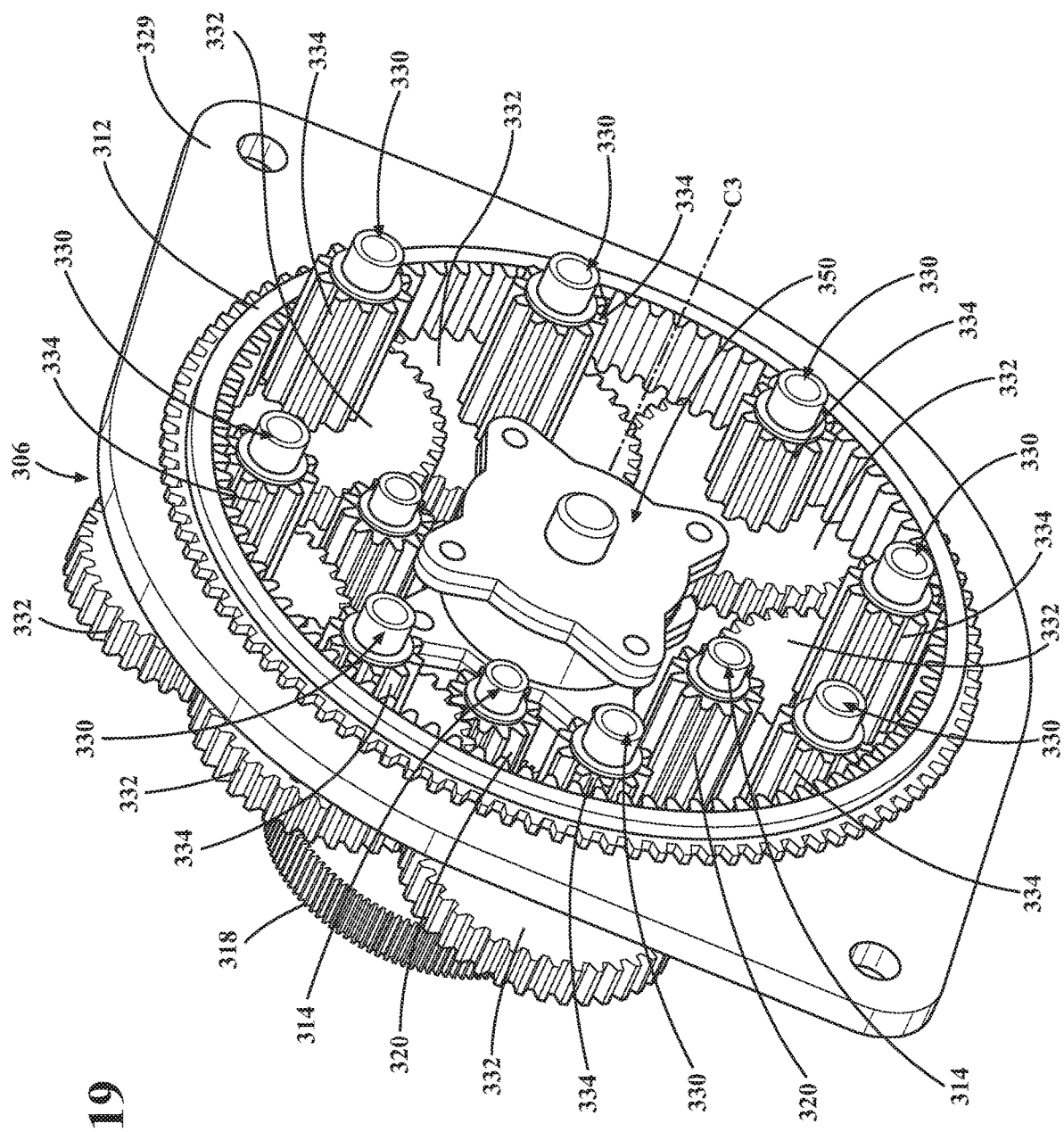
FIG. 19 is another perspective view of the planetary gear train and a roller clutch device of the rotary actuator of FIG. 16.

The gear arrangement further comprises a carrier 316 rotatable about the center axis C3 relative to the input gear 308. The carrier 316 retains the first array of planet gear clusters 314 in direct meshing relationship with the input gear 308, keeps the first and second arrays of planet gear clusters 314, 330 in direct meshing relationship with each other, and keeps the second array of planet gear clusters 330 in direct meshing relationship with the ring gear 312. The carrier 316 revolves the first and second arrays of planet gear clusters 314, 330 about the center axis C3. As shown in FIGS. 18 and 19, the carrier 316 is removed to illustrate the meshing relationship between the first and second arrays of planet gear clusters 314, 330 and the ring gear 312. FIGS. 18 and 19 further show a roller clutch device 350, described in detail further below (shown in detail in FIGS. 22-25), disposed along the center axis C3 and coupled to the carrier 316. The roller clutch device 350 is coupled to the carrier 316 to permit movement of the movable member 86 through application of the forward drive torque and prevent back drive torque applied to the output element 304 from moving the movable member 86 in at least one direction.

Figure 20:
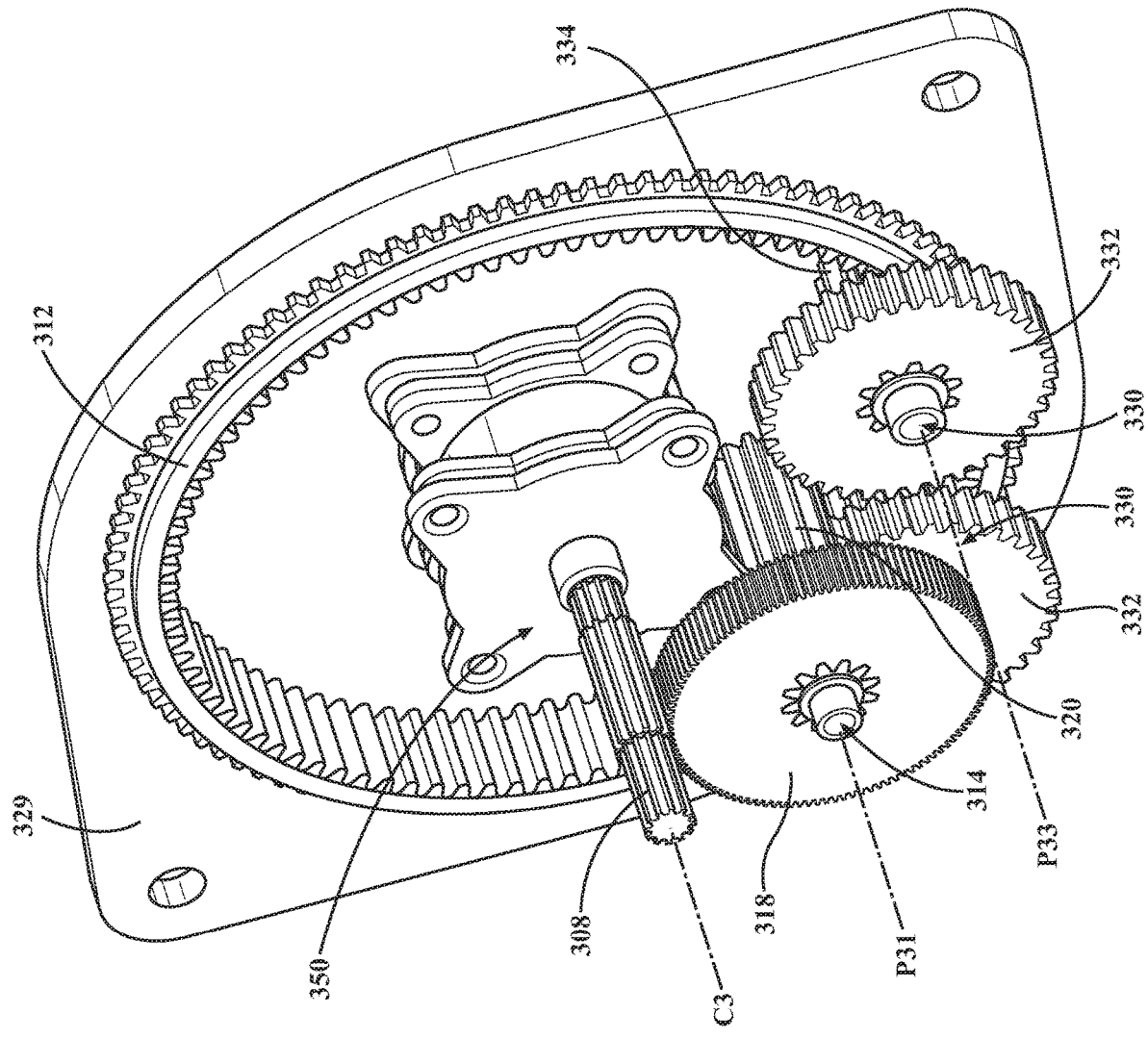
FIG. 20 is a perspective view of part of the planetary gear train and the roller clutch device of FIG. 19.
Figure 21:
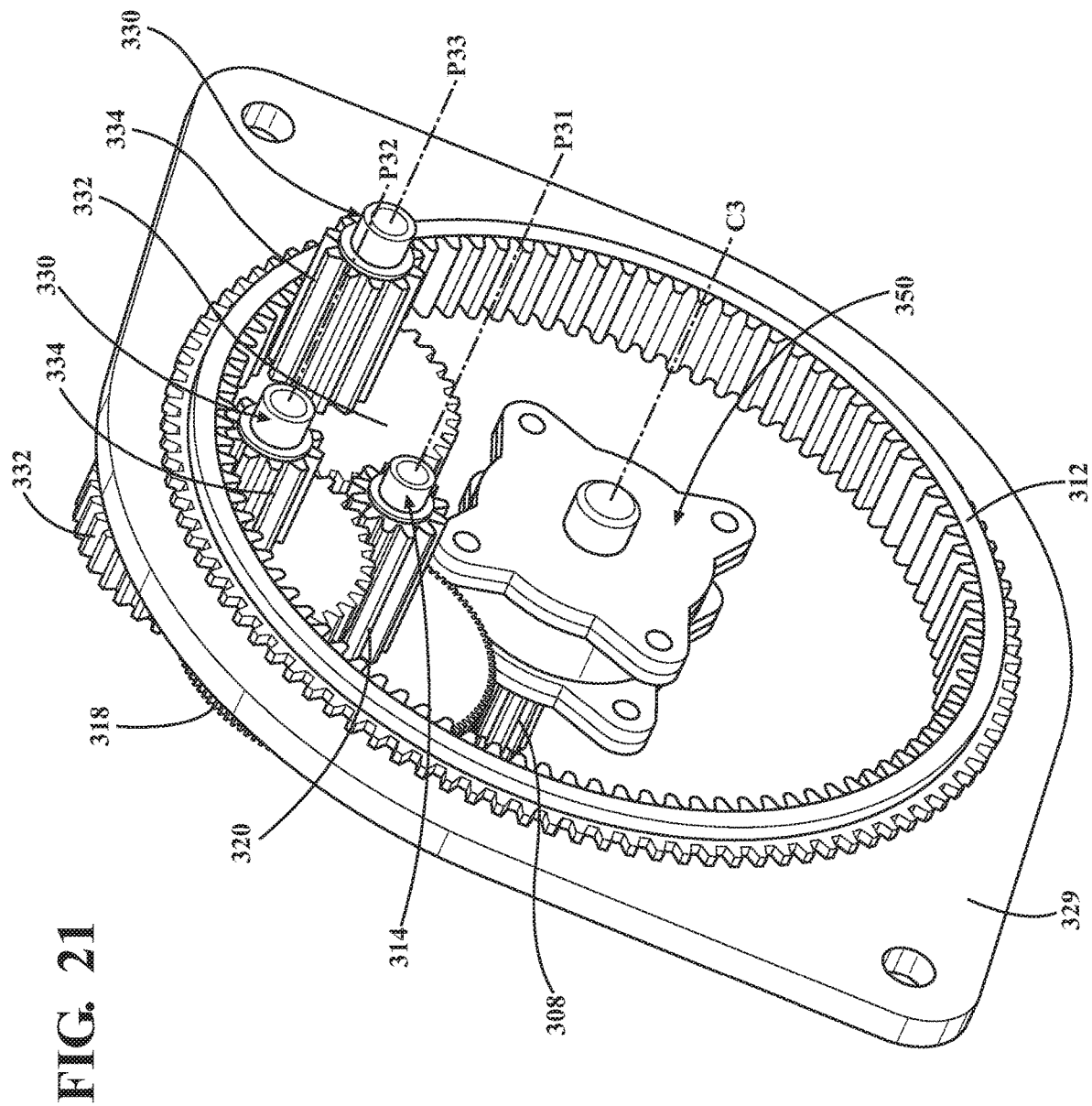
FIG. 21 is another perspective view of part of the planetary gear train and the roller clutch device of FIG. 19.

As shown in FIGS. 20 and 21, the carrier 316 and selected planet gear clusters in the first and second array of planet gear clusters 314, 330 are removed for ease of illustration and description.

As shown in FIGS. 20 and 21, the first array of planet gear clusters 314 comprises first planet gears 318 spaced from each other and rotatable about respective planet gear axes. In FIGS. 20 and 21, one such planet gear axis P31 is illustrated. Each of the first planet gears 318 is disposed in direct meshing relationship with the input gear 308.

The first array of planet gear clusters 314 further comprises second planet gears 320 fixed to the first planet gears 318 to rotate with the first planet gears 318 about the planet gear axes P31. Each of the second planet gears 320 is disposed in direct meshing relationship with two planet gear clusters of the second array of planet gear clusters 330. The planet gears 318, 320 may be integrally formed as shown in the figures. In alternative embodiments, the planet gears 318, 320 may be separate components fixed together.

The first planet gears 318 have physical configurations different from the second planet gears 320. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, and any combination thereof.

The first array of planet gear clusters 314 comprises four first planet gears 318 and four second planet gears 320. In some embodiments, the first array of planet gear clusters 314 comprises more than four first planet gears 318 and more than four second planet gears 320. In alternative embodiments, the first array of planet gear clusters 314 comprises fewer than four first planet gears 318 and fewer than four second planet gears 320.

As shown in FIGS. 20 and 21, the second array of planet gear clusters 330 comprises first planet gears 332 spaced from each other and rotatable about respective planet gear axes. In FIGS. 20 and 21, two such planet gear axes P32, P33 are illustrated. Two of the first planet gears 332 are disposed in direct meshing relationship with one of the second planet gears 320.

The second array of planet gear clusters 330 further comprises second planet gears 334 fixed to the first planet gears 332 to rotate with the first planet gears 332 about the planet gear axes P32, P33. Each of the second planet gears 334 is disposed in direct meshing relationship with the ring gear 312. Further, by virtue of being rotatably supported in the carrier 316 along with the first array of planet gear clusters 314, the carrier 316 rotates about the center axis C3 while the planet gears 332, 334 revolve about the center axis C3 with the planet gears 318, 320 of the first array of planet gear clusters 314 during actuation. The planet gears 332, 334 may be integrally formed as shown in the figures. In alternative embodiments, the planet gears 332, 334 may be separate components fixed together.

The first planet gears 332 have physical configurations different from the second planet gears 334. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, and any combination thereof.

The second array of planet gear clusters 330 comprises eight first planet gears 332 and eight second planet gears 334. In some embodiments, the second array of planet gear clusters 330 comprises more than eight first planet gears 332 and more than eight second planet gears 334. In alternative embodiments, the second array of planet gear clusters 330 comprises fewer than eight first planet gears 332 and fewer than eight second planet gears 334.

In the embodiments shown in FIGS. 16-21, the second array of planet gear clusters 330 comprises two first planet gears 332 and two second planet gears 334 for each first planet gear 318 and each second planet gear 320, respectively, of the first array of planet gear clusters 314. In other embodiments, the second array of planet gear clusters 330 comprises any number of first planet gears 332 and second planet gears 334 for each first planet gear 318 and second planet gear 320 of the first array of planet gear clusters 314.

The output element 304 forms part of the carrier 316 in the embodiment shown. Thus, the output element 304 comprises an output member that rotates about the center axis C3 while the planet gears 318, 320, 332, 334 revolve about the center axis C3.

Figure 22:
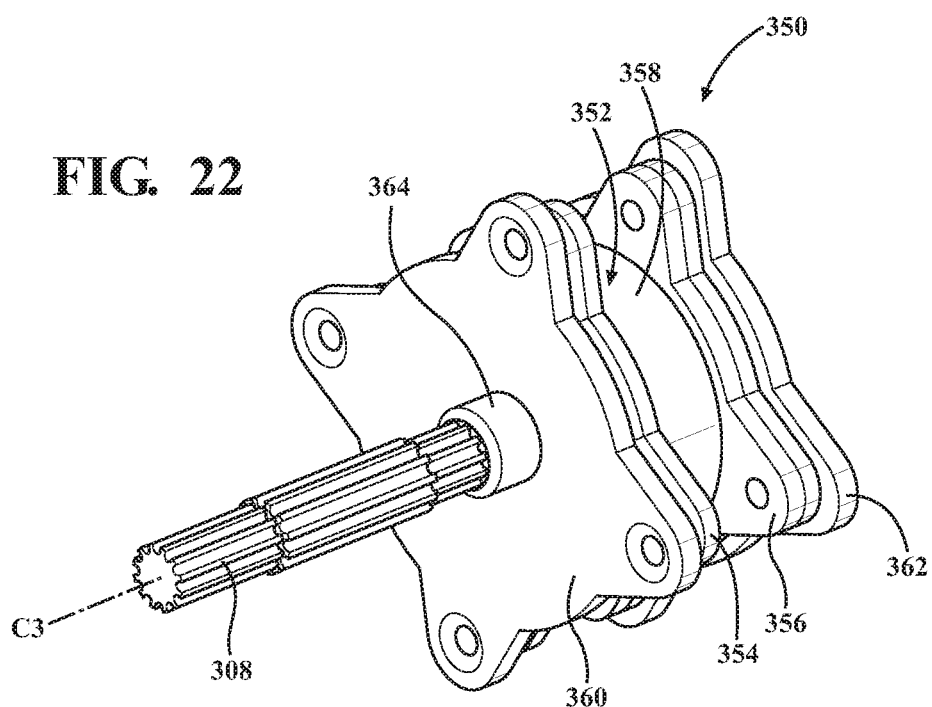
FIG. 22 is a perspective view of the roller clutch device.
Figure 23:
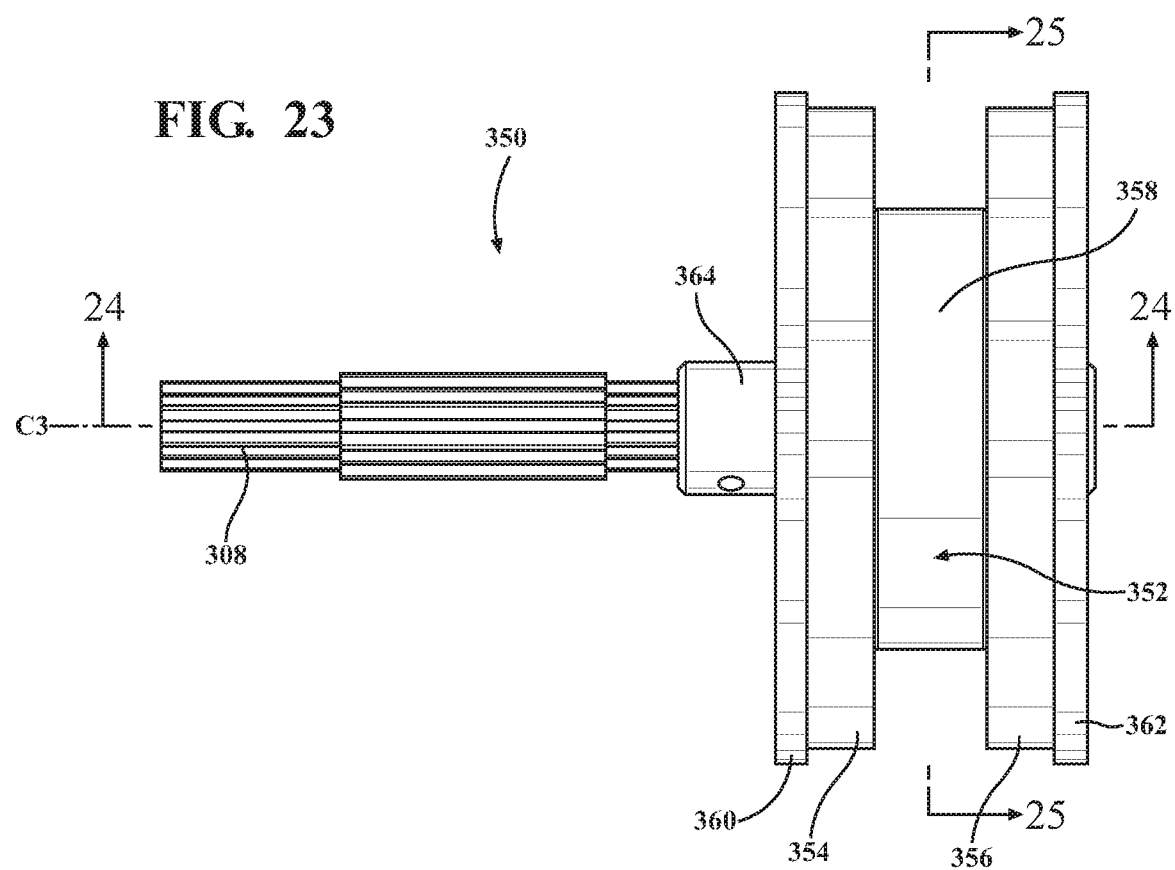
FIG. 23 is an elevational view of the roller clutch device.

As shown in FIGS. 22 and 23, the roller clutch device 350 comprises a roller clutch bearing 352 disposed between a first brake plate 354 and a second brake plate 356. The roller clutch bearing 352 comprises an outer race 358 abutting each of the first and second brake plates 354, 356. The roller clutch bearing 352, the first brake plate 354, and the second brake plate 354 are disposed between a first brake fastening plate 360 and a second brake fastening plate 362. The brake fastening plates 360, 362 use fasteners (not shown) to compress the brake plates 354, 356 toward the outer race 358 to retain the brake plates 354, 356 and the outer race 358 in an abutting, frictional relationship. In one embodiment, the force applied to the brake fastening plates 360, 362 is adjustable to change a pressure the brake plates 354, 356 impart on the outer race 358. In some embodiments, the force applied to the brake fastening plates 360, 362 is adjustable using a combination of one or more fasteners, and one or more springs (not shown) to retain constant compression of the brake plates 354, 356 against the outer race 358. The one or more springs provide better resolution on the brake load when tightening the fasteners to bring the brake fastening plates 360, 362 together.

The brake plates 354, 356 and brake fastening plates 360, 362 are coupled to the carrier 316 and configured to rotate with the carrier 316. The outer race 358 of the roller clutch bearing 352 is secured between the brake plates 354, 356 by friction force between the outer race 358 and the brake plates 354, 356. The outer race 358 is configured to rotate with the brake plates 354, 356 and the carrier 316 until another force counteracts the friction force as described below.

In the embodiment shown, the first and second brake fastening plates 360, 362 and first and second brake plates 354, 356 are shown as separate components. In alternative embodiments, the first brake fastening plate 360 and the first brake plate 354 comprise a unitary component and the second brake fastening plate 362 and the second brake plate 356 comprise another unitary component.

Figure 26:
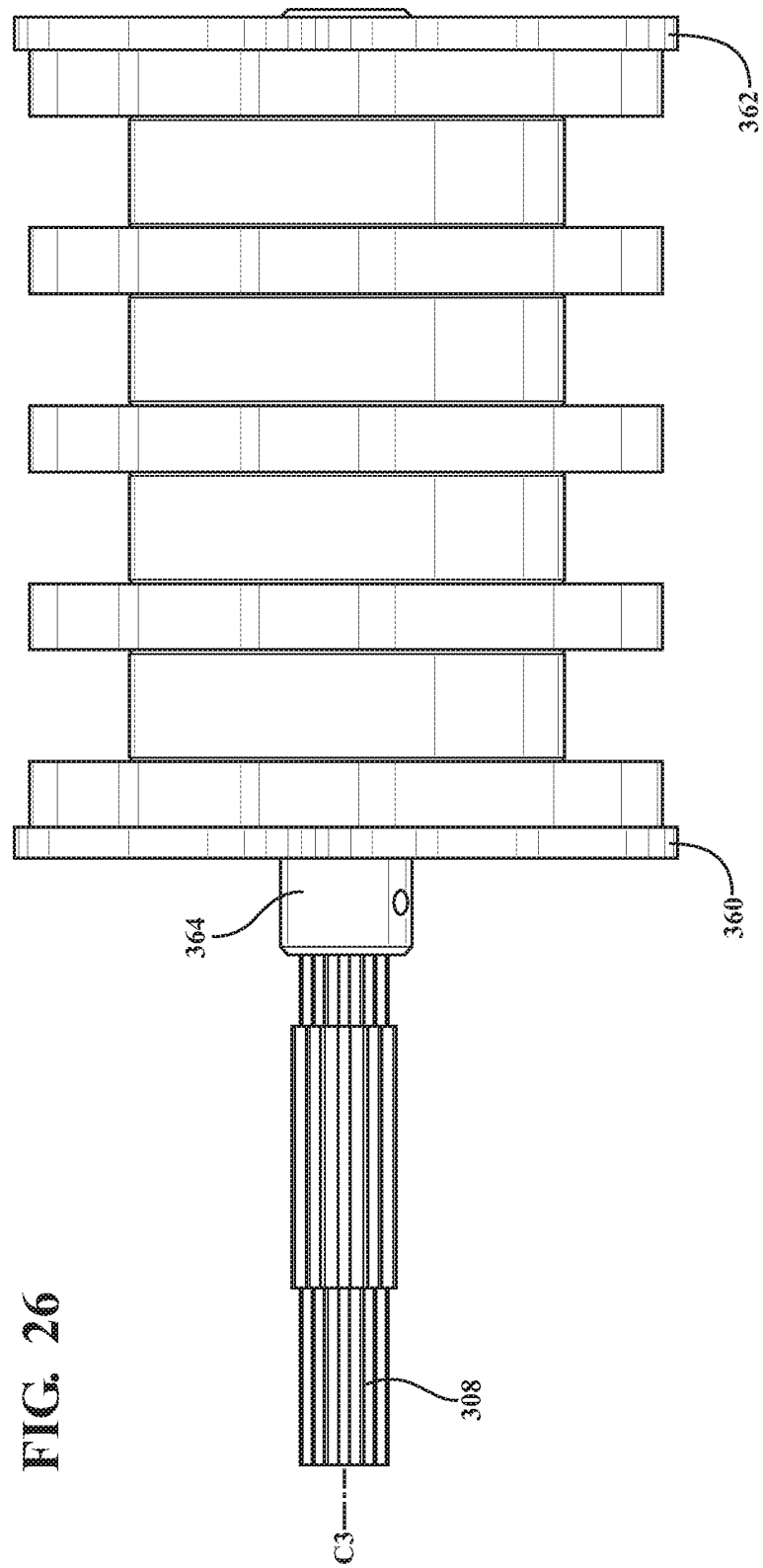
FIG. 26 is an elevational view of another embodiment of the roller clutch device.

In the embodiment shown, the roller clutch device 350 comprises two brake plates 354, 356 and one outer race 358 disposed between. In alternative embodiments, as shown in FIG. 26, the roller clutch device 350 comprises n brake plates and n−1 outer races, with each outer race disposed between consecutive brake plates, where n is greater than two. Increasing the number of brake plates and outer races increases the friction force between the brake plates and the outer races.

Figure 24:
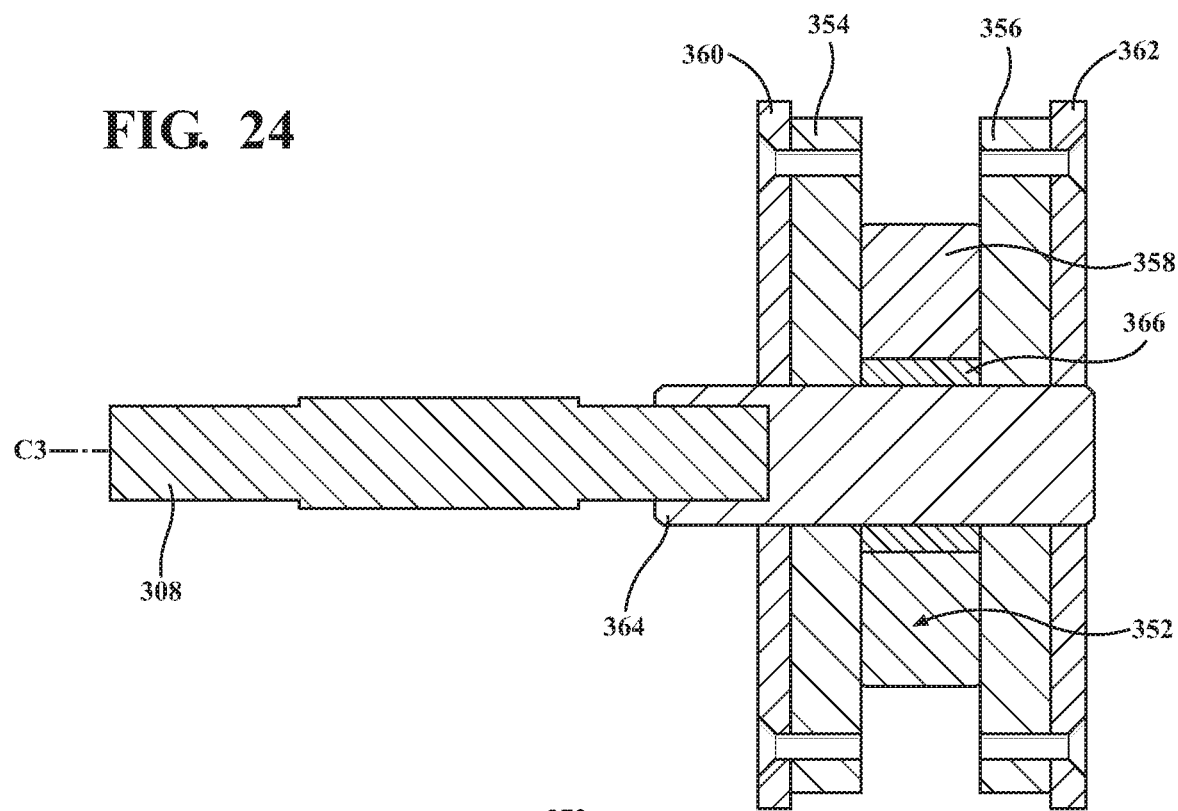
FIG. 24 is an elevational view illustrating a cross-section of FIG. 23.

As shown in FIGS. 23 and 24, the roller clutch bearing 352 comprises an inner race 364 disposed within the outer race 358 and configured to rotate relative to the outer race 358 in one direction (described in more detail below). The inner race 364 is fixed to the input gear 308 and configured to rotate with the input gear 308 in response to drive torque supplied by the motor 392. In the embodiments shown, the input gear 308 and inner race 364 comprise individual components fixed together. In alternative embodiments, the input gear 308 and inner race 364 comprise a single component.

Figure 25:
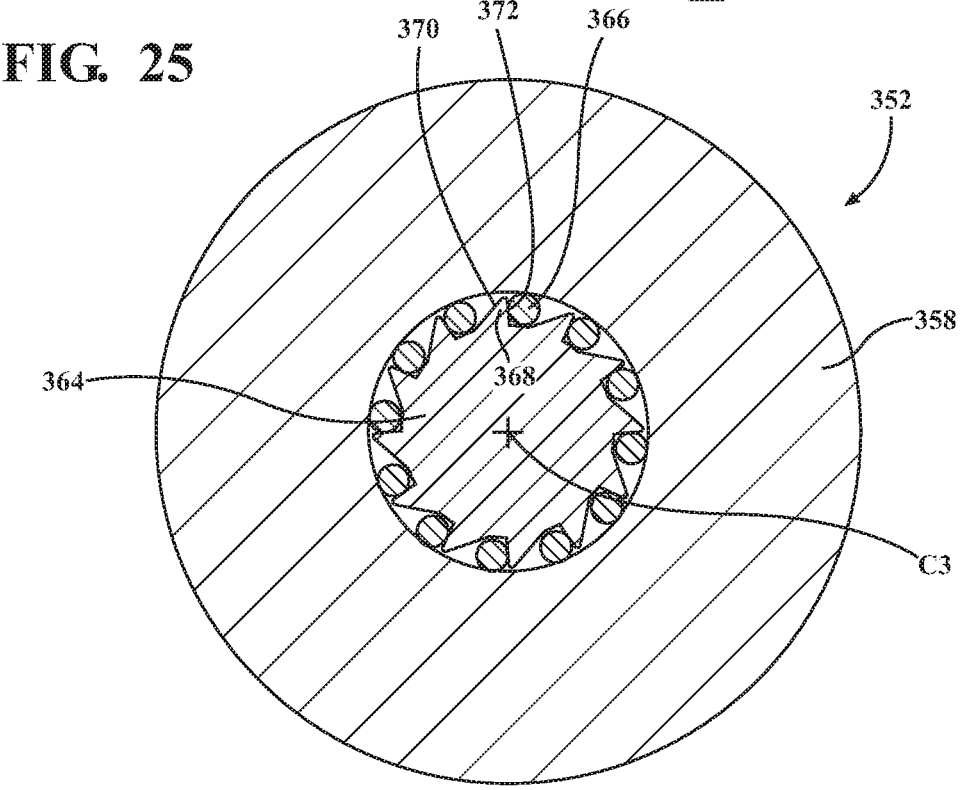
FIG. 25 is an elevational view illustrating another cross-section of FIG. 23.

As shown in FIG. 25, the roller clutch bearing 352 comprises a plurality of rollers 366 disposed between the inner race 364 and the outer race 358 and circumferentially arranged about the center axis C3 concentric with the inner race 364 and the outer race 358. The inner race 364 comprises a plurality of ramps 368 extending away from the center axis C3 toward the outer race 358 and between each of the plurality of rollers 366. Each of the plurality of ramps 368 comprises a first side, hereinafter referred to as a lock side 370, and a second side opposite the lock side 370, hereinafter referred to as the slip side 372. The lock side 370 of each ramp 368 is configured to abut one of the plurality of rollers 366 to pinch the one of the plurality of rollers 366 between the outer race 358 and the ramp 368, preventing relative rotation between the inner race 364 and the outer race 358. The slip side 372 of the ramp 368 is configured to abut one of the plurality of rollers 366 such that the one of the plurality of rollers 366 is not pinched between the ramp 368 and the outer race 358, permitting relative rotation between the inner race 364 and the outer race 358.

In operation, the motor 392 is configured to supply forward drive torque to the input gear 308 to rotate the input gear 308 about the center axis C3, which rotates the output element 304 through the first and second arrays of planet gear clusters 314, 330, which rotates the movable member 86 relative to the base 54.

Returning briefly to FIGS. 16 and 17, when forward drive torque is supplied by the motor 392 to the input gear 308 in a first direction, the movable member 86 moves away from the base 54. When forward drive torque is supplied to the input gear 308 in a second direction opposite the first direction, the movable member 86 moves toward the base 54. Each of these scenarios are discussed in more detail below.

When forward drive torque is supplied by the motor 392 to the input gear 308 in the first direction, the inner race 364 rotates with the input gear 308 to force the slip side 372 of each ramp 368 on the inner race 364 toward one of the rollers 366 disposed between the inner and outer races 364, 358. The inner race 364 is permitted to rotate relative to the outer race 358 and forward drive torque is applied to the first array of planet gear clusters 314, which applies torque to the second array of planet gear clusters 330, which applies torque to the ring gear 312, which rotates the carrier 316, and thus the movable member 86, away from the base 54.

When forward drive torque is supplied by the motor 392 to the input gear 308 in the second direction, the inner race 364 rotates with the input gear 308 to force the lock side 370 of each ramp on the inner race 364 toward one of the rollers 366 disposed between the inner and outer races 364, 358, pinching each of the rollers to the outer race 358. The inner race 364 is prevented from rotating relative to the outer race 358. When the motor 392 supplies enough drive torque to counteract friction torque created by the friction force applied between the brake plates 354, 356 and the outer race 358, the outer race 358 rotates with the inner race 364 and forward drive torque is applied to the first array of planet gear clusters 314, which applies torque to the second array of planet gear clusters 330, which applies torque to the ring gear 312, which rotates the carrier 316, and thus the movable member 86, toward the base 54. In this case, since substantial mass (load) is being carried by the movable member 86 (e.g., the weight of the patient, intermediate frame 56, patient support deck 58, etc.), and the actuator 301 is generally moving the load in the direction of gravity, additional torque is being supplied by the load to assist the motor 392 in counteracting the friction force applied between the brake plates 354, 356 and the outer race 358.

When back drive torque is applied to the movable member 86 in a direction that would move the movable member 86 away from the base 54, the carrier 316 rotates relative to the ring gear 312, back drive torque is applied to the second array of planet gear clusters 330, which applies torque to the first array of planet gear clusters 314, which applies torque to the input gear 308 which rotates the inner race 364 in the first direction, which forces the slip side 272 of each ramp 368 on the inner race 364 toward one of the rollers 366 disposed between the inner and outer races 364, 358, which permits the outer race 358, and thus the carrier 316 and movable arm 86, to continue rotating such that the movable member 86 moves away from the base 54. It is appreciated that the back drive torque applied would have to overcome any inefficiencies inherent in the gear reduction of the planetary gear train 306. Furthermore, in the embodiment described herein, such back driving would require lifting the load being carried by the movable member 86. Thus, in this case, back driving of the movable member 86 away from the base 54 is unlikely under normal circumstances.

When back drive torque is applied to the movable member 86 in a direction that would move the movable member 86 toward the base 54, the carrier 316 rotates relative to the ring gear 312, back drive torque is applied to the second array of planet gear clusters 330, which applies torque to the first array of planet gear clusters 314, which applies torque to the input gear 308 which rotates the inner race 364 in the second direction, which forces the lock side 370 of each ramp 368 on the inner race 364 toward one of the rollers 366 disposed between the inner and outer races 364, 358, pinching each of the rollers 366 to the outer race 358. The inner race 364 is thus prevented from rotating relative to the outer race 358. The back drive torque applied would have to counteract friction torque created by the friction force applied between the brake plates 354, 356 and the outer race 358. In many embodiments, the friction force and gear reduction are designed to prevent any normally occurring back drive torque applied to the movable member 86 from counteracting the friction force, such as back drive torque created by the load. In such embodiments, the outer race 358 is prevented from rotating relative to the brake plates 354, 356, and thus, the movable member 86 is prevented from moving toward the base 54.

In some embodiments, the roller clutch device 350 may incorporate features of a sprag clutch, a no-back device, or another rotation limiting device in place of or in addition to the above described components of the roller clutch device 350.

As previously described, the patient support apparatus 50 may have numerous devices that comprise one or more movable members that need to be moved to perform a desired function. The actuators 101, 301 described can be used to cause movement of such movable members. Although the actuators 101, 301 could be used in many different types of devices present on the patient support apparatus 50, only a few, non-limiting, additional examples are illustrated for convenience.

Referring to FIGS. 27-30, the actuators 101, 301 described above may be used for application in a lift system 200. The actuators 101, 301 are referenced as actuator 210. The lift system 200 is coupled to a base 202 and an intermediate frame 204 and moves the intermediate frame 204 relative to the base 202 between a raised position, a lowered position, and one or more positions therebetween.

Figure 27:
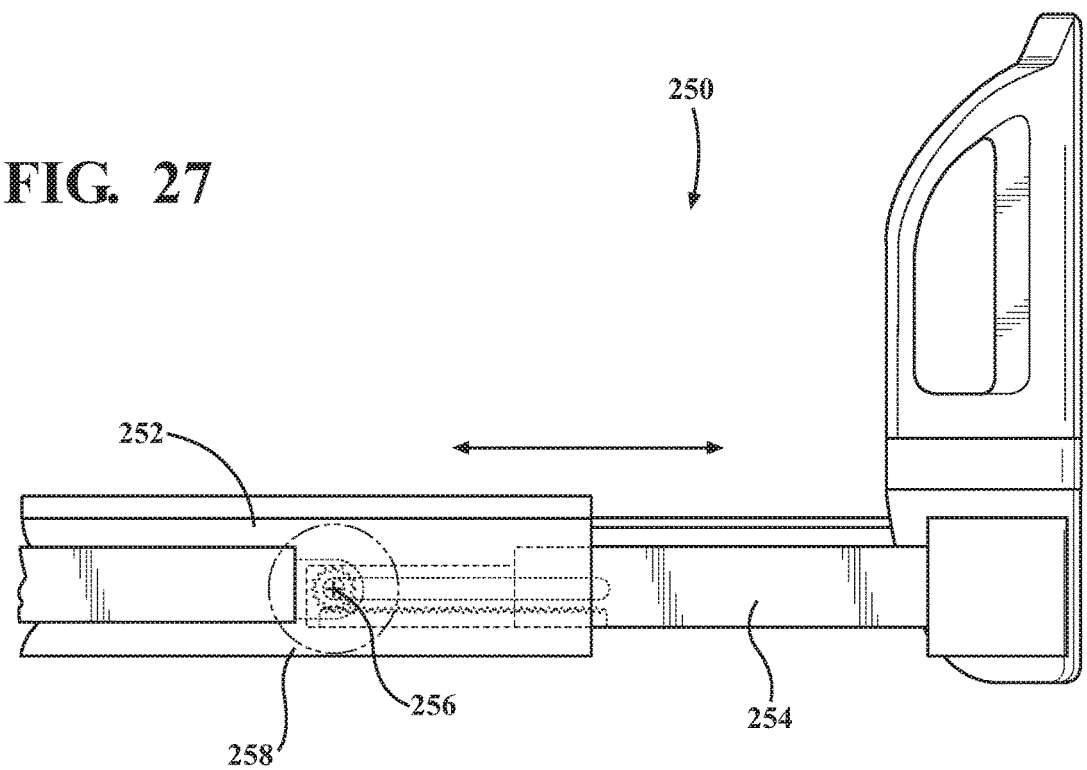
FIG. 27 is an elevational view illustrating various locations one of the actuators may be coupled.
Figure 28:
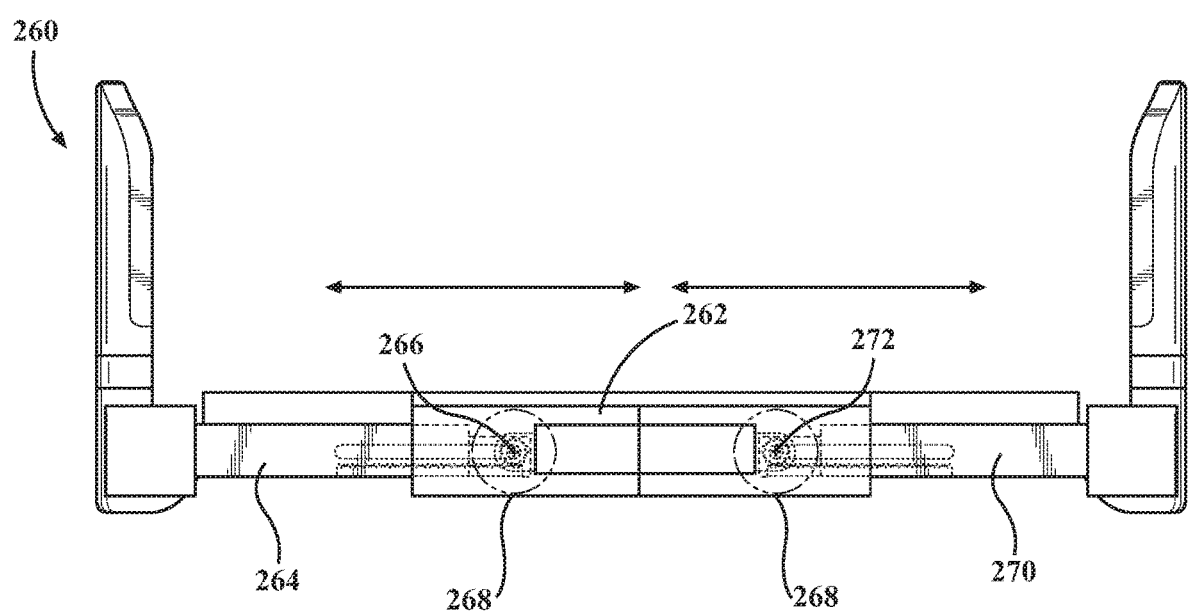
FIG. 28 is an elevational view illustrating a lift arm slidably coupled to the base of a patient support apparatus.

In one embodiment shown in FIG. 27, the lift system 200 comprises a head end lifting arm 206 pivotally coupled to the intermediate frame 204 at a head end joint 208 and slidably coupled to the base 202. The lift system 200 further comprises a first timing arm 212 pivotally coupled to the head end lifting arm 206 at a head end arm joint 214 and pivotally coupled to the base 202 at a head end base joint 216. The lift system 200 additionally comprises a foot end lifting arm 218 pivotally coupled to the intermediate frame 204 at a foot end joint 220 and slidably coupled to the base 202. The lift system 200 further comprises a second timing arm 222 pivotally coupled to the foot end lifting arm 218 at a foot end arm joint 224 and pivotally coupled to the base 202 at a foot end base joint 226. It should be appreciated that although reference is made to only a single head end lifting arm 206, a single foot end lifting arm 218, a single first timing arm 212, and a single second timing arm 222, multiples of such arms could also be employed.

In this embodiment, two actuators 210 are utilized for raising and lowering the intermediate frame 204 relative to the base 202. More specifically, one actuator 210 is coupled to one of the head end joints 208, 214, 216 and another actuator 210 is coupled to one of the foot end joints 220, 224, 226.

In another embodiment, more than two actuators 210 are coupled to the head end joints 208, 214, 216 and the foot end joints 220, 224, 226 as long as at least one actuator 210 is coupled to one of the head end joints 208, 214, 216 and at least one actuator 210 is coupled to one of the foot end joints 220, 224, 226.

In one embodiment, one actuator 210 is coupled to the head end joint 208 and another actuator 210 is coupled to the foot end joint 220. The head end lifting arm 206 is a movable member and the actuator 210 coupled to the head end joint 208 drives movement of the head end lifting arm 206 relative to the intermediate frame 204. The foot end lifting arm 218 is another movable member and the actuator 210 coupled to the foot end joint 220 drives movement of the foot end lifting arm 218 relative to the intermediate frame 204. The actuator 210 coupled to the head end joint 208 and the actuator 210 coupled to the foot end joint 220 operate in concert to raise and lower the intermediate frame 204 relative to the base 202 so that the intermediate frame 204 remains horizontal and parallel with a floor surface. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

In another embodiment shown in FIG. 29, the lift system 200 comprises a head end upper arm 228 pivotally coupled to the intermediate frame 204 at the head end joint 208 and a head end lower arm 230 pivotally coupled to the base 202 at the head end base joint 216. The head end upper arm 228 is pivotally coupled to the head end lower arm 230 at a head end middle joint 232. The lift system 200 further comprises a foot end upper arm 234 pivotally coupled to the intermediate frame 204 at the foot end joint 220 and a foot end lower arm 236 pivotally coupled to the base 202 at the foot end base joint 226. The foot end upper arm 234 is pivotally coupled to the foot end lower arm 236 at a foot end middle joint 238. It should be appreciated that although reference is made to only a single head end upper arm 228, a single head end lower arm 230, a single foot end upper arm 234, and a single foot end lower arm 236, multiples of such arms could also be employed.

The lift system comprises multiple actuators 210. One actuator 210 is coupled to each of the head end middle joint 232, the foot end middle joint 238, the head end base joint 216, and the foot end base joint 226. One of the head end upper 228 lower 230 arms is a movable member and one of the foot end upper 234 and lower 236 arms is another movable member. The actuator 210 coupled to the head end middle joint 232 drives movement of the head end upper 228 and lower 230 arms relative to each other. The actuator 210 coupled to the foot end middle joint 238 drives movement of the foot end upper 234 and lower 236 arms relative to each other. The actuator 210 coupled to the head end base joint 216 drives movement of the head end lower arm 230 relative to the base 202. The actuator 210 coupled to the foot end base joint 226 drives movement of the foot end lower arm 236 relative to the base 202. The actuators 210 in this embodiment, operate in concert to raise and lower the intermediate frame 204 relative to the base 202. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

In another embodiment shown in FIG. 30, the lift system 200 comprises a center lifting arm 240 pivotally coupled to the intermediate frame 204 at a top joint 242 and pivotally coupled to the base 202 at a bottom joint 244. It should be appreciated that although reference is made to only a single center lifting arm 240 multiple center lifting arms 240 could also be employed. In this embodiment, two actuators 210 are utilized for raising and lowering the intermediate frame 204 relative to the base 202. More specifically, one actuator 210 is coupled to the top joint 242 and another actuator 210 is coupled to the bottom joint 244. The center lifting arm 240 is a movable member for both actuators 210 and the intermediate frame 204 is a movable member for the actuator 210 at the top joint 242 (to control Trendelenburg and reverse Trendelenburg positioning). The actuators 210 drive movement of the center lifting arm 240 relative to the intermediate frame 204 and base 202 and work in concert to raise and lower the intermediate frame 204 relative to the base 202. Alternatively, one of the actuators 210 may drive movement, while the other actuator 210 remains stationary to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

Figure 31:
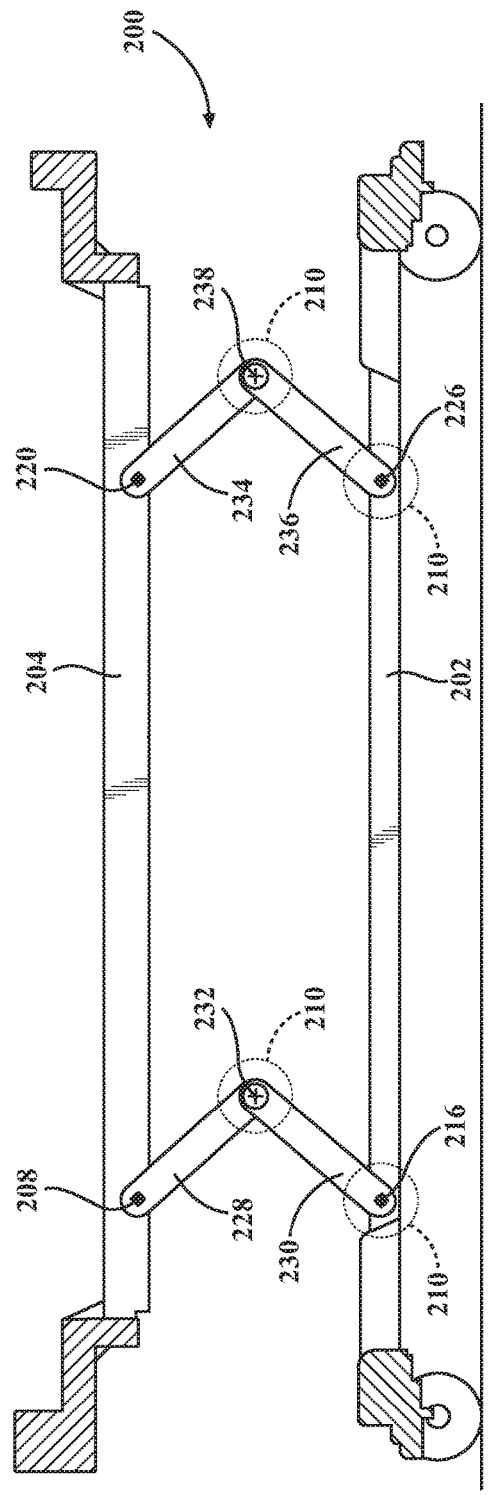
FIG. 31 is an elevational view illustrating one of the actuators coupled to a bed length extension device.

In another embodiment shown in FIG. 31, the actuators 101, 301 described above may be used for application in a bed length extension device 250. The actuators 101, 301 are referenced as actuator 258. The bed length extension device 250 comprises a support frame 252 coupled to an extending member 254 at a joint 256. The bed length extension device 250 adjusts a length of the patient support apparatus 50 to accommodate patients of greater than average height. The actuator 258 is coupled to the support frame 252 and the extending member 254 and drives movement of the extending member 254 relative to the support frame 252 e.g., by driving a gear that slides a toothed rack fixed to the extending member 254. Thus, moving the extending member 254 away from the support frame 252 to lengthen the patient support apparatus 50.

Figure 32:
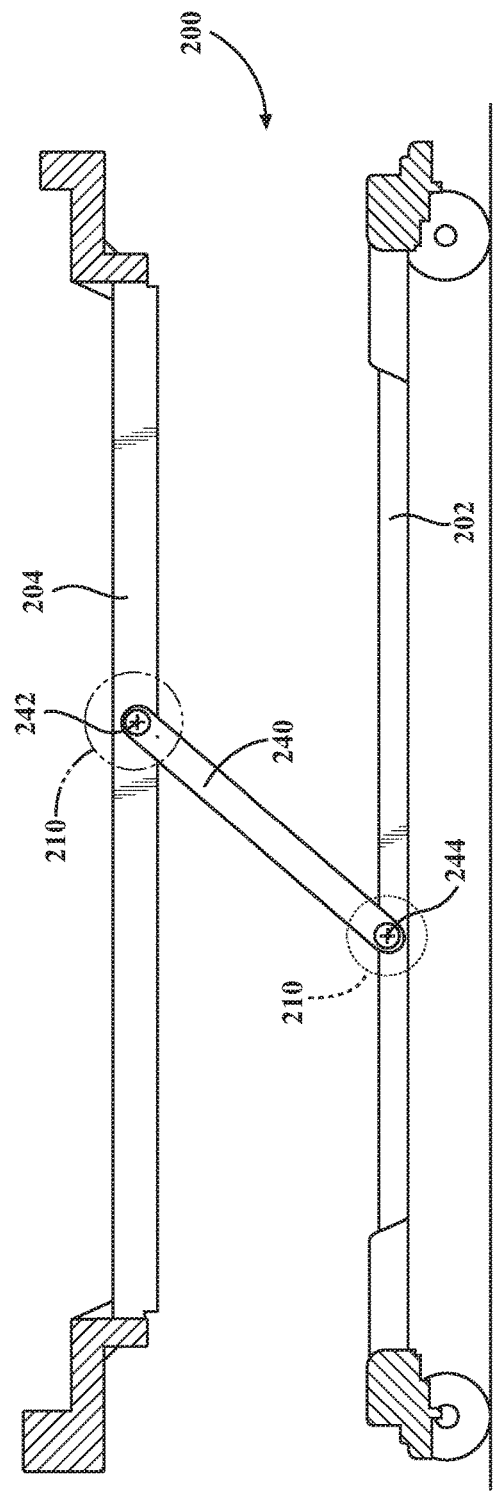
FIG. 32 is an elevational view illustrating one of the actuators coupled to a bed width extension device.

In another embodiment shown in FIG. 32, the actuators 101, 301 described above may be used for application in a bed width extension device 260. The actuators 101, 301 are referenced as actuator 268. The bed width extension device 260 comprises a support frame 262 coupled to a first extending member 264 at a first joint 266. The bed width extension device 260 further comprises a second extending member 270 coupled to the support frame 262 at a second joint 272. The bed width extension device 260 adjusts a width of the patient support apparatus 50 to accommodate patients of greater than average width. One actuator 268 is coupled to the first joint 266 and drives movement of the first extending member 264 relative to the support frame 262 (e.g., by driving a first gear that slides a first toothed rack fixed to the first extending member 264). Another actuator 268 is coupled to the second joint 272 and drives movement of the second extending member 270 relative to the support frame 262 (e.g., by driving a second gear that slides a second toothed rack fixed to the second extending member 270). The first 264 and second 270 extending members move away from the support frame 262 to widen the patient support apparatus 50. In one embodiment, only one of the actuators 268 drives movement of one of the extending members 264, 270 away from the support frame 262.

In another embodiment, the actuators 101, 301 described above may be used anywhere in the patient support apparatus 50 including driving wheels, side rails, footboard, headboard, or any other movable component of the patient support apparatus 50. The gears and other components of the actuators 101, 301 could be formed of metal, plastic, other suitable materials, or combinations thereof. Likewise, the movable members 86 could be formed of metal, plastic, other suitable materials, or combinations thereof. Additionally, various connections between the output elements and the movable members 86 are possible, such as welding, fastening, and the like. For instance, in FIGS. 4 and 16, the output elements may be connected to the movable members 86 through openings in the seat section 40 or openings in the base 54 via a direct connection, a rigid coupling, or the like.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus comprising:
a patient support surface;
a first member and a movable member, said movable member movable relative to said first member; and
an actuator comprising:
a gear assembly having an input element, an output element connected to said movable member, and a gear arrangement operable between said input element and said output element;
a motor configured to apply drive torque to said input element to rotate said output element through said gear arrangement; and
a rotation limiting device coupled to said gear assembly to permit movement of said movable member relative to said first member through application of said drive torque from said input element to said output element and prevent back drive torque applied to said output element from moving said movable member in at least one direction relative to said first member;
wherein said rotation limiting device comprises a braking surface and a braking element, said braking element operably coupled to said input element and said output element for concurrent movement with said input element and said output element, with said braking element engageable with said braking surface to prevent back drive torque applied to said output element from moving said movable member relative to said first member.

2. The patient support apparatus of claim 1, wherein said rotation limiting device comprises a first brake plate, a second brake plate, and a roller clutch bearing disposed between said first brake plate and said second brake plate, and wherein at least one of the first brake plate and the second brake plate comprises the braking surface, and wherein the roller clutch bearing comprises the braking element.

3. The patient support apparatus of claim 2, wherein said roller clutch bearing comprises an outer race releasably coupled by friction force between said first brake plate and said second brake plate, and an inner race disposed within said outer race and coupled to said input element, with said inner race configured to rotate relative to said outer race in a first direction in response to said drive torque from said motor, and with said inner race configured to rotate with said outer race relative to said first and second brake plates in a second direction in response to said drive torque from said motor.

4. The patient support apparatus of claim 1, wherein said rotation limiting device comprises a housing and said braking element forms part of a braking assembly, with said braking element of said braking assembly comprising a first lock cam movably coupled to said housing, and said braking assembly comprising a second lock cam movably coupled to said housing.

5. The patient support apparatus of claim 4, wherein said rotation limiting device comprises an outer ring operably coupled to the housing, said outer ring comprising the braking surface, and wherein said first and second lock cams are configured to engage the braking surface of the outer ring.

6. The patient support apparatus of claim 4, wherein said first and second lock cams are independently movable relative to said housing between a first position in contact with said braking surface, a second position spaced from said braking surface and at least one intermediate position between said first and second positions.

7. The patient support apparatus of claim 6, wherein said housing is restricted from rotating in a first direction relative to said braking surface when said first lock cam is in said first position and said housing is restricted from rotating in a second direction relative to said braking surface when said second lock cam is in said first position.

8. The patient support apparatus of claim 7, wherein said housing is free to rotate in said first direction when said first lock cam is in said second position and said housing is free to rotate in said second direction when said second lock cam is in said second position.

9. The patient support apparatus of claim 8, wherein said rotation limiting device further comprises a no-back input shaft rotatable relative to said braking surface and said housing in response to said drive torque from said motor.

10. The patient support apparatus of claim 9, wherein said rotation limiting device further comprises a no-back gear arrangement between said no-back input shaft and said first and second lock cams to independently move said first and second lock cams between said first and second positions in response to rotation of said no-back input shaft.

11. The patient support apparatus of claim 10, wherein said rotation limiting device comprises a drive dog fixed to said no-back input shaft and said housing comprises at least one protrusion, wherein said drive dog is configured to abut said protrusion when said no-back input shaft is rotated to interconnect rotation of said no-back input shaft to said housing so that said housing rotates with rotation of said no-back input shaft.

12. The patient support apparatus of claim 11, wherein said protrusion is spaced from said drive dog such that said no-back input shaft rotates one of said first and second lock cams to said second position before said drive dog abuts said protrusion.

13. The patient support apparatus of claim 1, wherein said gear assembly comprises a first planetary gear train and a second planetary gear train operably connected in sequence with said first planetary gear train.

14. The patient support apparatus of claim 13, wherein said first planetary gear train comprises a first planetary gear train input gear rotatable about a center axis and configured to receive said drive torque from said motor, a first planetary gear train output member rotatable about said center axis and coupled to said rotation limiting device, and a first planetary gear train gear arrangement operable between said first planetary gear train input gear and said first planetary gear train output member with said first planetary gear train gear arrangement configured to transmit drive torque available at said first planetary gear train input gear to said first planetary gear train output member and said rotation limiting device.

15. The patient support apparatus of claim 14, wherein said second planetary gear train comprises a second planetary gear train input gear coupled to said rotation limiting device, a second planetary gear train output member rotatable about said center axis, and a second planetary gear train gear arrangement operable between said second planetary gear train input gear and said second planetary gear train output member.

16. The patient support apparatus of claim 15, wherein said input element comprises said first planetary gear train input gear and said output element comprises said second planetary gear train output member.

17. The patient support apparatus of claim 16, wherein said motor is configured to rotate said first planetary gear train input gear about said center axis, which rotates said first planetary gear train output member about said center axis, which rotates said rotation limiting device about said center axis, which rotates said second planetary gear train input gear about said center axis, which rotates said second output member about said center axis, which moves said movable member relative to said first member.

18. The patient support apparatus of claim 1, wherein said movable member comprises one or more of a lift member, a patient support deck member, a bed length extension member, a bed width extension member, a wheel, a side rail, a footboard, or a headboard.

19. The patient support apparatus of claim 1, comprising a patient support deck having a base section and a movable section movable relative to said base section, wherein said actuator is mounted to said base section and said movable section comprises said movable member.

20. The patient support apparatus of claim 1, comprising a patient support deck having a fowler section and a seat section, wherein said actuator is mounted to said seat section and said fowler section comprises said movable member.

21. The patient support apparatus of claim 1, comprising a patient support deck having a foot section and a seat section, wherein said actuator is mounted to said seat section and said foot section comprises said movable member.

22. The patient support apparatus of claim 1, comprising a support frame, a base, a first lift member, and a second lift member movable relative to said first lift member to lift and lower said support frame relative to said base, wherein said actuator is mounted to one of said base, said support frame, said first lift member, and said second lift member.

* * * * *